United States Patent
Ito et al.

(10) Patent No.: US 9,189,319 B2
(45) Date of Patent: Nov. 17, 2015

(54) MANAGEMENT SYSTEM FOR OUTPUTTING INFORMATION DENOTING RECOVERY METHOD CORRESPONDING TO ROOT CAUSE OF FAILURE

(71) Applicant: Hitachi, Ltd., Tokyo (JP)

(72) Inventors: Atsushi Ito, Fujisawa (JP); Nobuo Beniyama, Yokohama (JP); Yuji Mizote, Kamakura (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 13/845,992

(22) Filed: Mar. 18, 2013

(65) Prior Publication Data

US 2013/0219225 A1    Aug. 22, 2013

Related U.S. Application Data

(63) Continuation of application No. 12/529,522, filed as application No. PCT/JP2009/003358 on Jul. 16, 2009, now Pat. No. 8,429,453.

(51) Int. Cl.
*G06F 11/07* (2006.01)
*G06F 11/30* (2006.01)
*G06F 11/32* (2006.01)

(52) U.S. Cl.
CPC .......... *G06F 11/079* (2013.01); *G06F 11/0748* (2013.01); *G06F 11/3055* (2013.01); *G06F 11/327* (2013.01)

(58) Field of Classification Search
CPC . H04L 7/042; H04L 41/0631; H04L 12/2419; H04L 41/147; H04L 43/50; H04L 41/22; G06F 11/079; G06F 11/0793; G06F 11/2257; G06F 11/0775; G06F 11/0781; H04Q 2213/13162
USPC ............................................. 714/25, 39, 2, 20
See application file for complete search history.

(56) References Cited

U.S. PATENT DOCUMENTS

| | | | |
|---|---|---|---|
| 4,779,208 A * | 10/1988 | Tsuruta et al. | 706/57 |
| 5,214,653 A | 5/1993 | Elliott et al. | |
| 5,261,086 A | 11/1993 | Shiramizu | |
| 5,557,765 A * | 9/1996 | Lipner et al. | 380/286 |
| 5,572,670 A | 11/1996 | Puckett | |
| 6,072,777 A * | 6/2000 | Bencheck et al. | 370/244 |
| 6,173,266 B1 * | 1/2001 | Marx et al. | 704/270 |

(Continued)

FOREIGN PATENT DOCUMENTS

| | | | |
|---|---|---|---|
| JP | 2006-526842 A | 11/2006 | |
| JP | 2006-338305 A | 12/2006 | |

(Continued)

OTHER PUBLICATIONS

F. Hayes-Roth, "Rule-Based Systems," Communications of the ACM, vol. 28, No. 9, Sep. 1985, pp. 921-932.

*Primary Examiner* — Loan L. T. Truong
(74) *Attorney, Agent, or Firm* — Foley & Lardner LLP

(57) ABSTRACT

A management server includes a meta rule for identifying an event to be a root cause and a failure recovery method that corresponds to the meta rule for an event capable of occurring in a plurality of node apparatuses, and also displays a cause event to be a root cause of an event detected by the management server, and a method for recovering from this cause event.

9 Claims, 31 Drawing Sheets

(56) References Cited

U.S. PATENT DOCUMENTS

| | | | |
|---|---|---|---|
| 6,226,659 B1 | 5/2001 | Wong et al. | |
| 7,254,515 B1 | 8/2007 | Ohsie et al. | |
| 7,478,404 B1* | 1/2009 | Campbell | 719/318 |
| 7,571,150 B2 | 8/2009 | Raghavan et al. | |
| 7,788,534 B2* | 8/2010 | Akiyama et al. | 714/26 |
| 7,877,636 B2 | 1/2011 | Kim et al. | |
| 7,917,814 B2 | 3/2011 | Hu et al. | |
| 7,979,747 B2* | 7/2011 | Bhatnagar et al. | 714/38.1 |
| 8,024,617 B2 | 9/2011 | Kudo et al. | |
| 8,086,905 B2* | 12/2011 | Matsumoto et al. | 714/47.1 |
| 8,112,378 B2 | 2/2012 | Kudo et al. | |
| 8,180,724 B1 | 5/2012 | Qureshi et al. | |
| 8,326,969 B1* | 12/2012 | Batra et al. | 709/224 |
| 8,381,038 B2* | 2/2013 | Hasegawa et al. | 714/39 |
| 8,392,236 B2* | 3/2013 | Fung et al. | 705/7.27 |
| 2002/0171546 A1 | 11/2002 | Evans et al. | 340/540 |
| 2003/0046390 A1* | 3/2003 | Ball et al. | 709/224 |
| 2004/0059966 A1 | 3/2004 | Chan et al. | |
| 2004/0078683 A1* | 4/2004 | Buia et al. | 714/37 |
| 2004/0153692 A1* | 8/2004 | O'Brien et al. | 714/4 |
| 2005/0091356 A1* | 4/2005 | Izzo | 709/223 |
| 2005/0125688 A1* | 6/2005 | Ogawa et al. | 713/200 |
| 2005/0172162 A1 | 8/2005 | Takahashi et al. | |
| 2005/0276217 A1* | 12/2005 | Gadgil et al. | 370/225 |
| 2005/0283638 A1* | 12/2005 | Kato | 714/2 |
| 2006/0041659 A1* | 2/2006 | Hasan et al. | 709/224 |
| 2006/0085689 A1 | 4/2006 | Bjorsne | |
| 2006/0112061 A1 | 5/2006 | Masurkar | |
| 2006/0123278 A1 | 6/2006 | Dini et al. | |
| 2006/0242288 A1 | 10/2006 | Masurkar | |
| 2006/0248407 A1* | 11/2006 | Adams et al. | 714/43 |
| 2006/0253740 A1 | 11/2006 | Ritz et al. | |
| 2007/0220303 A1 | 9/2007 | Kimura et al. | |
| 2008/0004841 A1 | 1/2008 | Nakamura | |
| 2008/0037443 A1* | 2/2008 | Ansari et al. | 370/254 |
| 2008/0080376 A1* | 4/2008 | Adhikari et al. | 370/231 |
| 2008/0080384 A1* | 4/2008 | Atkins et al. | 370/252 |
| 2008/0082527 A1 | 4/2008 | Yachiku et al. | |
| 2008/0091387 A1* | 4/2008 | Yamazaki et al. | 703/1 |
| 2008/0141076 A1 | 6/2008 | Hu et al. | |
| 2008/0183855 A1* | 7/2008 | Agarwal et al. | 709/223 |
| 2008/0263410 A1 | 10/2008 | Mittal et al. | |
| 2009/0072953 A1* | 3/2009 | Cagno et al. | 340/310.12 |
| 2009/0105982 A1 | 4/2009 | Sarig et al. | |
| 2009/0171707 A1* | 7/2009 | Bobak et al. | 705/7 |
| 2009/0172460 A1* | 7/2009 | Bobak et al. | 714/2 |
| 2009/0172674 A1* | 7/2009 | Bobak et al. | 718/101 |
| 2009/0210745 A1* | 8/2009 | Becker et al. | 714/26 |
| 2009/0232025 A1* | 9/2009 | Baggott et al. | 370/254 |
| 2009/0240990 A1* | 9/2009 | Gollub et al. | 714/45 |
| 2009/0300428 A1 | 12/2009 | Matsumoto et al. | |
| 2009/0313198 A1 | 12/2009 | Kudo et al. | |
| 2009/0313505 A1 | 12/2009 | McCroskey et al. | |
| 2010/0014424 A1* | 1/2010 | Agrawal et al. | 370/235 |
| 2010/0023604 A1* | 1/2010 | Verma et al. | 709/221 |
| 2010/0083029 A1* | 4/2010 | Erickson et al. | 714/2 |
| 2010/0100774 A1 | 4/2010 | Ding et al. | |
| 2010/0100775 A1 | 4/2010 | Slutsman et al. | |
| 2010/0153787 A1 | 6/2010 | Beattie et al. | |
| 2010/0199132 A1 | 8/2010 | Compton et al. | |
| 2010/0274789 A1* | 10/2010 | Grace et al. | 707/748 |
| 2010/0325493 A1 | 12/2010 | Morimura et al. | |
| 2011/0047414 A1* | 2/2011 | Kudo et al. | 714/37 |
| 2011/0125544 A1* | 5/2011 | Shtub | 705/7.23 |
| 2011/0264956 A1* | 10/2011 | Ito et al. | 714/20 |

FOREIGN PATENT DOCUMENTS

| | | |
|---|---|---|
| JP | 2009-043029 A | 2/2009 |
| JP | 2009-064101 A | 3/2009 |
| WO | WO-03/005200 A1 | 1/2003 |
| WO | WO-2004/061681 A1 | 7/2004 |
| WO | WO-2004/090691 A2 | 10/2004 |

* cited by examiner

FIG.4

SERVER INFORMATION

111

| SERVER ID | SERVER NAME | SERVER VENDOR | SERVER IP ADDRESS | SERVER OS | SERVER CONTINUOUS OPERATION TIME |
|---|---|---|---|---|---|
| E001 | MOMO | COMPANY A | 10.202.21.13 | Windows | 1409939 |
| E002 | UME | COMPANY B | 10.202.21.14 | Linux | 1030349 |
| : | : | : | : | : | : |

SWITCH INFORMATION

112

| SWITCH ID | SWITCH NAME | SWITCH VENDOR | SWITCH IP ADDRESS | SWITCH TYPE | SWITCH CONTINUOUS OPERATION TIME |
|---|---|---|---|---|---|
| W001 | KIKU | COMPANY A | 10.202.21.20 | FC SWITCH | 34000 |
| W002 | TUBAKI | COMPANY B | 10.202.21.21 | IP SWITCH | 783451 |
| : | : | : | : | : | : |

STORAGE INFORMATION 113

| STORAGE ID | STORAGE NAME | STORAGE VENDOR | STORAGE IP ADDRESS | STORAGE FIRMWARE | STORAGE CONTINUOUS OPERATION TIME |
|---|---|---|---|---|---|
| T001 | HASU | COMPANY A | 10.202.21.13 | V4.2.2b | 345252 |
| T002 | BOTAN | COMPANY B | 10.202.21.1 | V1.2.1 | 342262 |
| ⋮ | | ⋮ | ⋮ | ⋮ | ⋮ |

TOPOLOGY INFORMATION 114

| TOPOLOGY ID | SERVER ID | SWITCH ID | STORAGE ID |
|---|---|---|---|
| 001 | E023 | W012 | T015 |
| 002 | E023 | W012 | T014 |
| ⋮ | ⋮ | ⋮ | ⋮ |

META RCA RULE INFORMATION 115

| META RCA RULE ID | SERVER EVENT | SWITCH EVENT | STORAGE EVENT | CAUSE NODE | CAUSE |
|---|---|---|---|---|---|
| 001 | SCUZZY DISK DRIVE ERROR | IIP SWITCH ERROR | STORAGE VOLUME ERROR | SWITCH | IP SWITCH ERROR |
| 002 | SCUZZY DISK DRIVE ERROR | NONE | STORAGE CONTROLLER ERROR | STORAGE | STORAGE CONTROLLER ERROR |
| : | : | : | : | : | : |

EXPANDED RCA RULE INFORMATION 116

| EXPANDED RCA RULE ID | META RCA RULE ID | TOPOLOGY ID | CAUSE NODE ID | CAUSE DETAILS |
|---|---|---|---|---|
| 001 | 001 | 001 | W032 | IP SWITCH ERROR |
| 002 | 001 | 002 | W032 | IP SWITCH ERROR |
| : | : | : | : | : |

EVENT INFORMATION 117

| EVENT ID | EVENT TYPE | TARGET NODE TYPE | TARGET NODE ID | EVENT DETAILS | OCCURRENCE DATE/TIME | STATUS |
|---|---|---|---|---|---|---|
| 001 | CRITICAL | STORAGE | T002 | SCUZZY DISK DRIVE ERROR | 2009/4/2 13:30:20 | RESOLVED |
| 002 | WARNING | SWITCH | W031 | PERFORMANCE DROP LESS THAN THRESHOLD | 2009/4/2 15:23:11 | UN-RESOLVED |
| : | : | | : | : | : | : |

FAILURE ANALYSIS CONTEXT — 120

| | |
|---|---|
| FAILURE ANALYSIS CONTEXT ID | 00001 |
| META RCA RULE ID | 032 |
| EXPANDED RCA RULE ID | 093 |
| TOPOLOGY ID | 001 |
| SERVER ID | 011 |
| SWITCH ID | 012 |
| STORAGE ID | 002 |

601 — FAILURE ANALYSIS CONTEXT ID
602 — META RCA RULE ID
603 — EXPANDED RCA RULE ID
604 — TOPOLOGY ID
605 — SERVER ID
606 — SWITCH ID
607 — STORAGE ID

FIG.12A

| | FAILURE RECORD ENTRY | 1191 |
|---|---|---|
| 701 | FAILURE RECORD ID | 00001 |
| 702 | META RCA RULE ID | 032 |
| 703 | EXPANDED RCA RULE ID | 093 |
| 704 | TOPOLOGY ID | 001 |
| 705 | SERVER ID | 011 |
| 706 | SWITCH ID | 012 |
| 707 | STORAGE ID | 002 |
| 708 | SERVER WEIGHT ID | 00001 |
| 709 | SWITCH WEIGHT ID | 00023 |
| 710 | STORAGE WEIGHT ID | 00011 |
| 711 | CAUSE | SOFTWARE FAILURE IN STORAGE CONTROL DRIVER |
| 712 | RECOVERY METHOD | RE-INSTALL STORAGE CONTROL DRIVER |

FIG.12B

SERVER WEIGHT INFORMATION

800

| SERVER WEIGHT ID | SERVER VENDOR | SERVER IP ADDRESS | SERVER OS | SERVER CONTINUOUS OPERATION TIME |
|---|---|---|---|---|
| 00001 | 50 | 20 | 80 | 0 |
| 00002 | 100 | 20 | 80 | 0 |
| : | : | : | : | : |

SWITCH WEIGHT INFORMATION

810

| SWITCH WEIGHT ID | SWITCH VENDOR | SWITCH IP ADDRESS | SWITCH TYPE | SWITCH CONTINUOUS OPERATION TIME |
|---|---|---|---|---|
| 00001 | 70 | 20 | 100 | 0 |
| 00002 | 70 | 20 | 100 | 0 |
| : | : | : | : | : |

STORAGE WEIGHT INFORMATION

820

| STORAGE WEIGHT ID | STORAGE VENDOR | STORAGE IP ADDRESS | STORAGE FIRMWARE | STORAGE CONTINUOUS OPERATION TIME |
|---|---|---|---|---|
| 00001 | 30 | 20 | 10 | 80 |
| 00002 | 0 | 20 | 100 | 0 |
| : | : | : | : | : |

SEARCH-ORIGIN FAILURE ANALYSIS CONTEXT

EXPANDED RCA RULE
- META RCA RULE: IF A THEN B
- META RCA RULE:: IF B THEN C
- META RCA RULE:: IF B THEN D

TWO META RCA RULE MATCHES

FAILURE ANALYSIS CONTEXT
INSIDE FAILURE RECORD ENTRY

EXPANDED RCA RULE
- META RCA RULE: IF A THEN B
- META RCA RULE: IF B THEN C
- META RCA RULE: IF B THEN E

FIG.18G

SEARCH-ORIGIN FAILURE ANALYSIS CONTEXT

| ELEMENT | VALUE | WEIGHT |
|---|---|---|
| SERVER VENDOR | COMPANY A | 50 |
| SERVER IP ADDRESS | 10.202.21.213 | 20 |
| SERVER OS | WinXP | 80 |
| SERVER CONTINUOUS OPERATION TIME | 3200 | 10 |

FIRST FAILURE RECORD ENTRY

| ELEMENT | VALUE | EVALUATION VALUE |
|---|---|---|
| SERVER VENDOR | COMPANY A | 50 |
| SERVER IP ADDRESS | 10.222.21.211 | 0 |
| SERVER OS | WinXP | 80 |
| SERVER CONTINUOUS OPERATION TIME | 200 | 0 |

CUMULATIVE EVALUATION VALUE 130

SECOND FAILURE RECORD ENTRY

| ELEMENT | VALUE | EVALUATION VALUE |
|---|---|---|
| SERVER VENDOR | COMPANY B | 0 |
| SERVER IP ADDRESS | 10.202.21.5 | 20 |
| SERVER OS | Linux | 0 |
| SERVER CONTINUOUS OPERATION TIME | 3300 | 10 |

CUMULATIVE EVALUATION VALUE 30

FIG.19

ROOT CAUSE CANDIDATE LIST AND CERTAINTY FACTOR

| CANDIDATE ID | CAUSE NODE NAME | CAUSE DETAILS | CERTAINTY FACTOR |
|---|---|---|---|
| 01 | TUBAKI | IP SWITCH ERROR | 70% |
| 02 | MOMO | NIC MALFUNCTION | 50% |
| 03 | BOTAN | STORAGE SHUTDOWN | 10% |
| : | : | : | : |

FIG.20

FAILURE RECORD SEARCH RESULTS — 2020

| RECORD ID | FAILURE RECORD ID | CAUSE NODE NAME | CAUSE | RECOVERY METHOD | MATCH PROBABILITY |
|---|---|---|---|---|---|
| 01 | 034 | TUBAKI | IIP SWITCH ERROR | RE-INSTALL FIRMWARE | 80% |
| 02 | 042 | KIKU | IP SWITCH ERROR | REPLACE IP SWITCH | 70% |
| 03 | 123 | YURI | IP SWITCH ERROR | REPLACE IP SWITCH | 70% |
| ⋮ | ⋮ | ⋮ | ⋮ | ⋮ | ⋮ |

Command CONFIGURATION

| | |
|---|---|
| ID | C001 |
| TARGET | FIRMWARE ▼ |
| PROCESS | VERSION UPGRADE ▼ |
| DETAILS | CONTACT SYSTEM ADMINISTRATOR, OBTAIN AND INSTALL LATEST SWITCH FIRMWARE |

ROOT CAUSE CANDIDATE LIST AND CERTAINTY FACTOR

| SERVER REBOOTED | 7 TIMES |
|---|---|
| SERVER REPLACED | 2 TIMES |
| RECOVERY FROM BACKUP | 1 TIME | e21

| CANDIDATE ID | CAUSE NODE NAME | CAUSE DETAILS | META RECOVERY METHOD COMMAND | CERTAINTY FACTOR |
|---|---|---|---|---|
| 01 | TUBAKI | IP SWITCH ERROR | REBOOT SERVER | 70% |
| 02 | MOMO | NIC MALFUNCTION | REBOOT SERVER REPLACE SERVER | 50% |
| 03 | BOTAN | STORAGE SHUTDOWN | RECOVERY FROM BACKUP | 10% |
| : | : | : | : | : | e22

FIG.24A

DEGREE OF MATCH COMPARISON CHART

| ORIGIN OF SEARCH | |
|---|---|
| META RCA RULE ID | 034 |
| CAUSE EVENT | TUBAKI : IP SWITCH ERROR |
| AFFECT EVENT (1) | MOMO: SCUZZY DISK DRIVE ERROR |
| AFFECT EVENT (2) | HASU : THRESHOLD EXCEED PERFORMANCE DROP | e01

| LOG LIST 02 | |
|---|---|
| META RCA RULE ID | 034 |
| CAUSE EVENT | KIKU :IP SWITCH ERROR |
| AFFECT EVENT (1) | MOMO : SCUZZY DISK DRIVE ERROR |
| AFFECT EVENT (2) | HASU : THRESHOLD EXCEED PERFORMANCE DROP |
| AFFECT EVENT(3) | BOTAN: I/O ERROR | e02

| DEGREE OF MATCH |
|---|
| 70% | e03

| RECOVERY METHOD |
|---|
| REPLACE IP SWITCH | e04

MANAGEMENT SYSTEM FOR OUTPUTTING INFORMATION DENOTING RECOVERY METHOD CORRESPONDING TO ROOT CAUSE OF FAILURE

CROSS-REFERENCE TO RELATED PATENT APPLICATIONS

This application is a Continuation of U.S. application Ser. No. 12/529,522 (National Stage of PCT/JP2009/003358), filed Sep. 1, 2009, incorporated herein by reference in its entirety.

TECHNICAL FIELD

The present invention relates to the output of information denoting a method for recovering from a failure.

BACKGROUND ART

In line with the rapid growth of Internet businesses recently, decreases in corporate credibility and lost business opportunities brought on by service stoppages due to system failures have become major problems. For this reason, rapid recovery from a failure is desirable.

As a system for supporting the identification of a recovery method, for example, there is the failure record database system disclosed in Patent Literature 1. A system administrator registers a failure that has occurred in a monitoring target node and the method actually used to recover from this failure in this database system as a failure record. The database system maintains a plurality of failure records. In a case where a new failure occurs, the administrator of the monitoring target node (may be called the "system administrator" below) inputs the desired keyword. The database system retrieves the failure record that conforms to the inputted keyword from the plurality of failure records.

Meanwhile, there is a monitoring system for monitoring the operational status of the monitoring target node. The monitoring system receives a change in the operational status of the monitoring target node (for example, an input/output (I/O) error with respect to a disk device and a drop in processor throughput) as an event from this monitoring target node. The system administrator becomes aware of the nature of this event by receiving this event via a message or warning lamp. The administrator learns about the failure (for example, a service stoppage or drop in performance) in this monitoring target node from the nature of this event, and predicts the root cause of this failure.

Further, Root Cause Analysis (called RCA below) is a technique for predicting the root cause of a failure. The monitoring system maintains combinations of event groups and root causes as rules, and when an event has been received, infers the root cause of this event from the rule including this event.

According to Patent Literature 2, inconsistency is calculated for cases in which the event that occurred is a known event and cases in which it is an unknown event, and the calculated inconsistency is taken into account in inferring the root cause of the failure.

According to Patent Literature 3, information denoting an environmental relationship between monitoring target nodes is constructed. When inferring the root cause of a failure, the monitoring target node that will be affected by a failure that has occurred in a certain monitoring target node is identified on the basis of this information.

CITATION LIST

Patent Literature

[PTL 1]
Japanese Patent Application Laid-open No. 2009-43029
[PTL 2]
Japanese Patent Application Laid-open No. 2006-526842
[PTL 3]
U.S. Pat. No. 7,478,404

Non Patent Literature

[NPL 1]
Frederick Hayes-Roth, "Rule-Based Systems", Communications of the ACM, September 1985, pages 921-932.

SUMMARY OF INVENTION

Technical Problem

However, none of the technologies of Patent Literatures 1 through 3 makes it possible for the system administrator to quickly identify the best method for recovering from the failure.

For example, it is supposed that the monitoring target node is a server A including a switch A and a communication interface device (communication I/F) that is coupled to the switch A, that the server A carries out I/O with respect to a storage apparatus by way of the switch A, and that a failure has occurred in the communication I/F (for example, a NIC (Network Interface Card)) of the server A. This failure generates a first event, in which the I/O throughput of the server A reaches an abnormal value, and a second event, in which the network traffic of the switch A reaches an abnormal value. The monitoring system detects an event group including the first and second events. The details of this event group are sent to the system administrator. At this time, it is assumed that the same event is not stored in the failure record database system but that a similar event is stored therein. "Same event" is a failure record including information denoting the same failure as the failure that occurred (a failure corresponding to the event group). "Similar event" is a failure record including information denoting a failure that differs from a failure that has occurred, and information denoting a recovery method that is the same as the method of recovery from a failure that has occurred.

According to the Patent Literature 1, the system administrator uses a desired keyword to retrieve the failure record. For this reason, depending on the keyword, there is a likelihood of either not getting a hit on the targeted failure record, or getting lots of hits on unrelated failure records.

According to the Patent Literature 2, in the case of a search query for the root cause of a failure, there is the likelihood of not getting a hit on the similar event even when a hit has been obtained on the same event.

According to the Patent Literature 3, there is the likelihood of obtaining a large number of hits on unrelated failure records in the case of a search query for either a monitoring target node in which a root cause failure has occurred, or a monitoring target node that is affected by this failure.

Accordingly, an object of the present invention is to make it possible for the system administrator to quickly identify an appropriate recovery method corresponding to the root cause of a failure.

Solution to Problem

A management server includes a meta rule for identifying an event that becomes a root cause for an event that is capable of occurring in a plurality of node apparatus, and a failure recovery method corresponding to the meta rule, and the management server displays a cause event, which is the root cause of a detected event, and also displays a method for recovering from this cause event. Furthermore, the recovery method may be information that is either created or updated on the basis of a recovery method, which was inputted by the administrator who is using the management server, and which was used when recovering from a failure that occurred in the above-mentioned plurality of node apparatuses.

BRIEF DESCRIPTION OF DRAWINGS

FIG. 4 is a block diagram showing the composition of server information.

FIG. 5 is a block diagram showing the composition of switch information.

FIG. 6 is a block diagram showing the composition of storage information.

FIG. 7 is a block diagram showing the composition of topology information.

FIG. 8 is a block diagram showing the composition of meta RCA rule information.

FIG. 9 is a block diagram showing the composition of expanded RCA rule information.

FIG. 10 is a block diagram showing the composition of event information.

FIG. 11 is a block diagram showing the composition of a failure analysis context.

FIG. 12A is a block diagram showing the composition of a failure record entry.

FIG. 12B is a block diagram showing the composition of server weight information.

FIG. 12C is a block diagram showing the composition of switch weight information.

FIG. 12D is a block diagram showing the composition of storage weight information.

FIG. 18E is a diagram showing an overview of failure analysis context matching.

FIG. 18G is a diagram showing an overview of failure analysis context matching.

FIG. 19 shows an example of a candidate/certainty factor screen.

FIG. 20 shows an example of a failure record search result screen.

FIG. 22B shows another example of a display area e13 in the meta recovery method registration screen.

FIG. 23 shows an example of the candidate/certainty factor screen displayed in the Example 2.

FIG. 24A shows a first example of a degree of match comparison screen.

DESCRIPTION OF EMBODIMENTS

A number of examples of the present invention will be explained below.

Example 1

<1-0: Composition of Computer System Related to Example 1>

Figure 1:
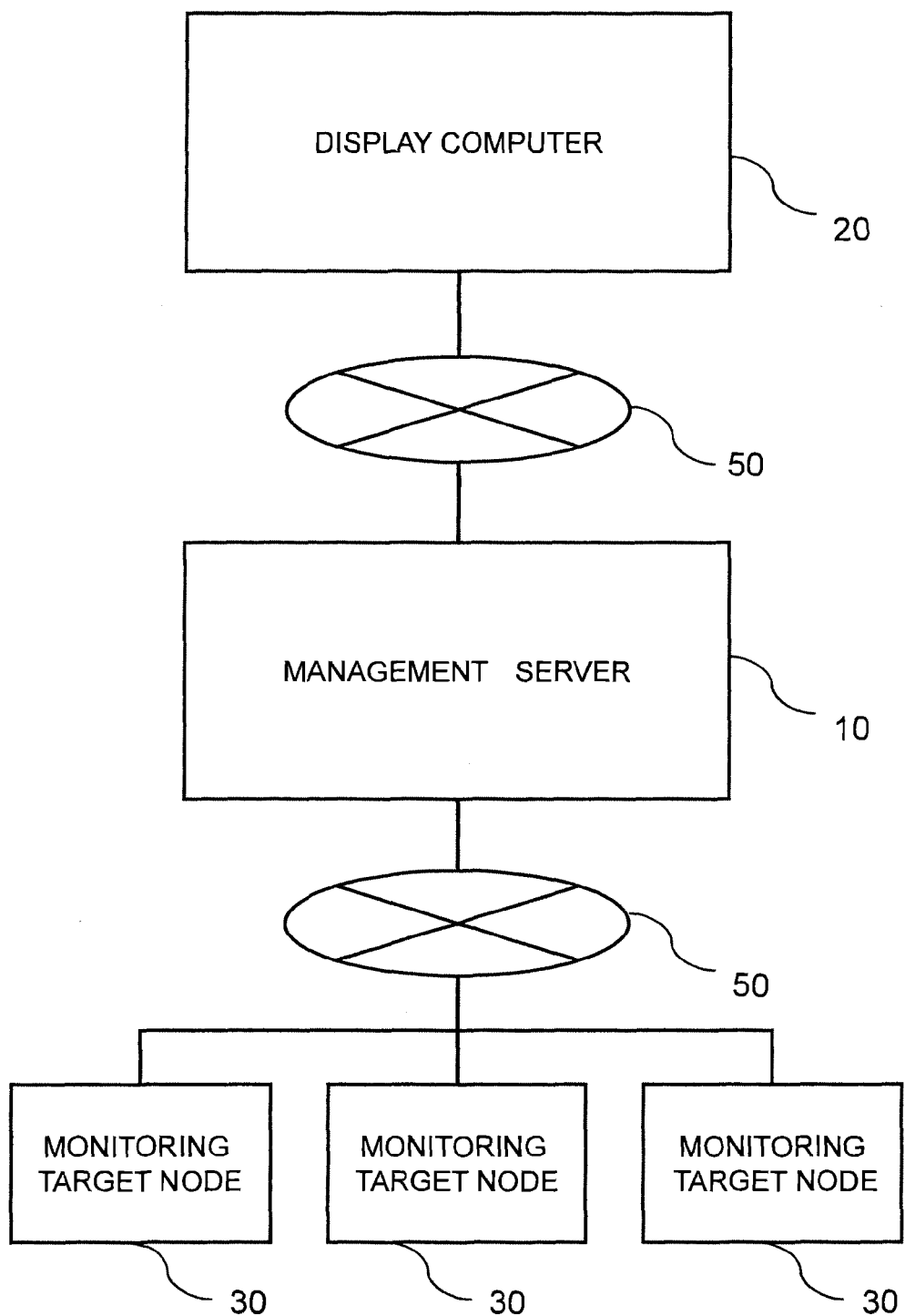
FIG. 1 is a block diagram showing the composition of a computer system related to an Example 1.

FIG. 1 is a block diagram related to the composition of a computer system 1 related to Example 1 of the present invention.

The computer system 1 includes a management server 10, a display computer 20, and a monitoring target node 30. Furthermore, one unit each of the management server 10, the display computer 20, and the monitoring target node 30 is shown in the drawing, but numerous units of each may be used.

The monitoring target node 30 is managed by the management server 10. Furthermore, an example of the monitoring target node 20 may be a server computer, a storage apparatus (for example, a disk array device including a RAID composition), a network switch (for example, a FC (Fibre Channel) switch), a router, and a proxy server, or it may be another device.

The management server 10 is a computer for managing one or more monitoring target nodes 30.

The display computer 20 includes a display screen for displaying information outputted from the management server 10.

The management server 10, the display computer 20, and the monitoring target node 30 are coupled together via a network 50. Furthermore, the network 50 that couples the management server 10 and the display computer 20 and the network 50 that couples the management server 10 and the monitoring target node 30 is the same network, but separate networks may also be used. Further, the management server 10 and the display computer 20 may be integrated into a single device. The management server 10 may also be comprised from a plurality of computers, and the functions of the management server 10 may be possessed by a plurality of computers. Furthermore, in the following explanation, the one or more computers that comprise the management server 10 and the display computer 20 may be described as the "management system". In a case where the management server 10 displays the display information, the management computer is the management system. Further, a combination of the management server 10 and the display computer 20 is also the management system.

Figure 2:
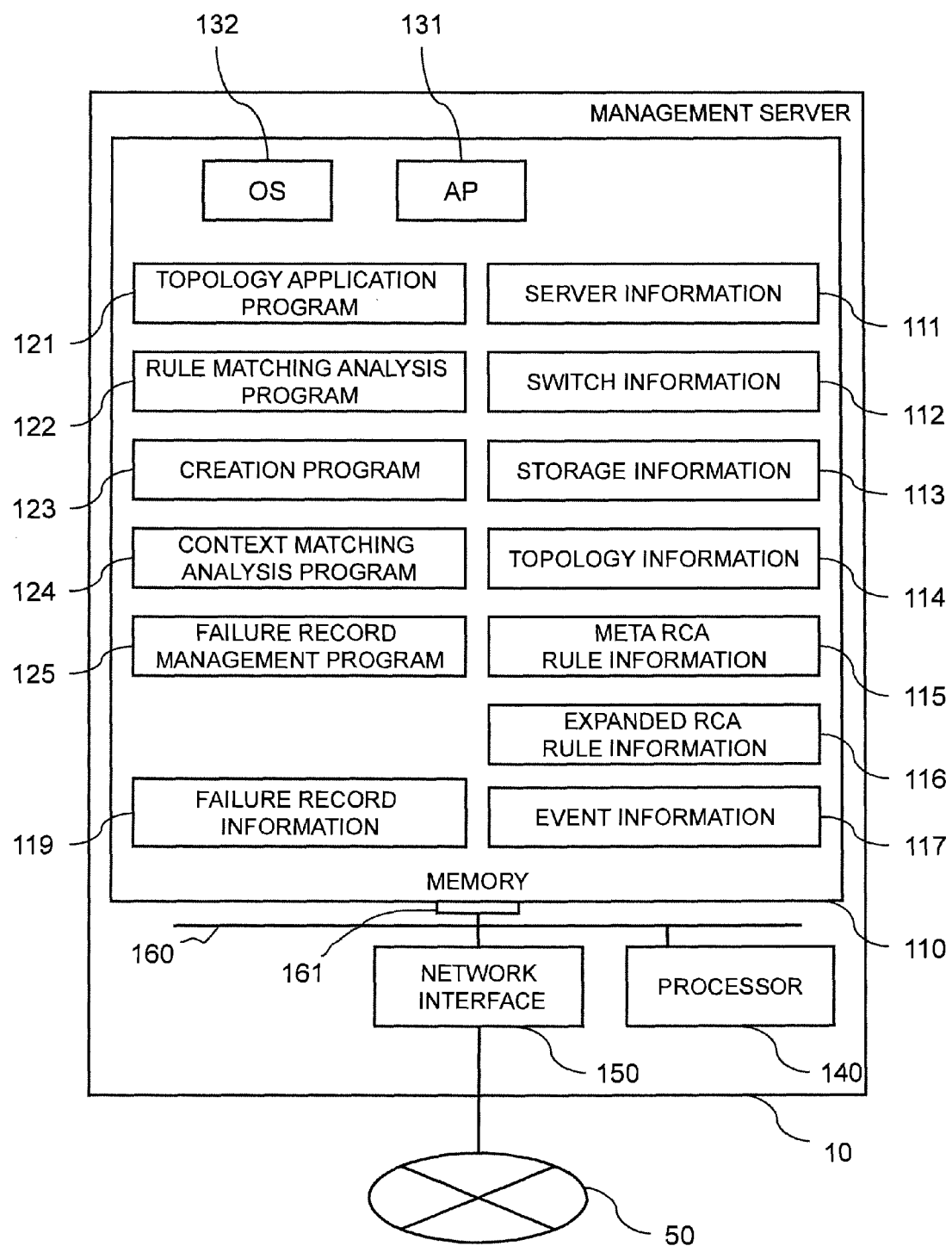
FIG. 2 is a block diagram showing the composition of a management server.

FIG. 2 shows the composition of the management server 10.

The management server 10 is a computer including a memory 110, a memory interface 161, a processor 140 and a network interface 150. The memory interface 161, the processor 140 and the network interface 150 are coupled together via an internal network (for example, a bus) 160.

The processor 140 accesses the memory 110 by way of the memory interface 161. The processor 140 carries out various processing by executing a program stored in the memory 110. In the explanation that follows, there may be a case in which an explanation is given using "program" as the subject, but since the program performs a prescribed process by being executed by the processor 140 while using the memory 110 and the network interface 150, the processor 140 may also be used as the subject in the explanation. Further, a process that is described having the program as the subject may also be a process that is carried out by the management server 10 or other such computer. The program may also be realized either in part or in whole by dedicated hardware.

Various programs may be installed in the respective computers from either a program source (for example, a program distribution server or a computer-readable storage media (for example, a portable media)).

Programs that are executed by the processor 140 and information that is needed by the processor 140 are stored in the memory 110. Specifically, for example, the memory 110 stores server information 111, switch information 112, storage information 113, topology information 114, meta RCA rule information 115, expanded RCA rule information 116, event information 117, failure record information 119, a topology application program 121, a rule matching analysis program 122, a creation program 123, a context matching analysis program 124 and a failure record management program 125. In addition, the memory 110 may also store an application program (called AP below) 131 and an OS (Operating System) 132.

The AP 131 is a program for realizing various processing. For example, the AP 117 provides either database management functions or WEB server functions. The OS 132 is a program for controlling all of the processing of the management server 10.

The server information 111 is for managing the composition information of a server, which is one type of monitoring target node.

The switch information 112 is for managing the composition information of a switch, which is one type of monitoring target node.

The storage information 113 is for managing the composition information of a storage apparatus, which is one type of monitoring target node.

The topology information 114 is for managing the information of the coupling composition (topology) of the server, the switch, and the storage, which are monitoring target nodes.

The meta RCA rule information 115 is for managing the meta RCA rule. The meta RCA rule will be explained in detail in <1-1: Definition of Terms> below.

The expanded RCA rule information 116 is for managing the expanded RCA rule. The expanded RCA rule will be explained in detail in <1-1: Definition of Terms> below.

The event information 117 is for managing an event record of an event that has occurred in the monitoring target node.

The failure record information 119 is comprised from one or more failure record entries. One failure record entry includes information denoting the cause of a failure that occurred in the past, information denoting the recovery method, and a failure analysis context. At the least, the failure record information 119 may be stored in an external storage resource (for example, an external storage apparatus). In accordance with this, for example, the processor 140 is able to access the failure record information 119 by way of the network interface 150.

The topology application program 121 uses the meta RCA rule information 115, the server information 111, the switch information 112, the storage information 113 and the topology information 114 to create the expanded RCA rule information 116.

The rule matching analysis program 122 uses the expanded RCA rule information 116 and the event information 117 to determine the certainty factor of the event information 117-related meta RCA rule information 115 and expanded RCA rule information 116.

The creation program 123 uses the meta RCA rule information 115, the expanded RCA rule information 116, the server information 111, the switch information 112, the storage information 113, and the topology information 114 to create the failure analysis context.

The context matching analysis program 124 matches the created failure analysis context with the failure analysis context inside each failure record entry.

The failure record management program 125 creates a failure analysis context including the created failure analysis context, information denoting the recovery method, and information denoting the nature of the failure that has occurred, and includes the failure analysis context in the failure record information 119.

The network interface 150 exchanges data via the network 50 with another computer (for example, the monitoring target node).

The various programs stored in the memory 110 do not necessarily have to be separate program codes, and one or more program codes may realize the program processing.

Another kind of storage resource (a storage apparatus) may be used instead of the memory 110.

Further, the management server 10 may comprise an input/output device. Examples of an input/output device include a display, a keyboard, and a pointer, but it may be a device other than these. Also, as an alternative to the input/output device, a serial interface or an Ethernet interface may be used as an input/output device, and may substitute for the input and displays of the input/output device by coupling a display computer including a display, a keyboard or a pointer device to this interface, and carrying out displays and receiving input via this display computer by sending display information to the display computer and receiving input information from the display computer.

Figure 3:
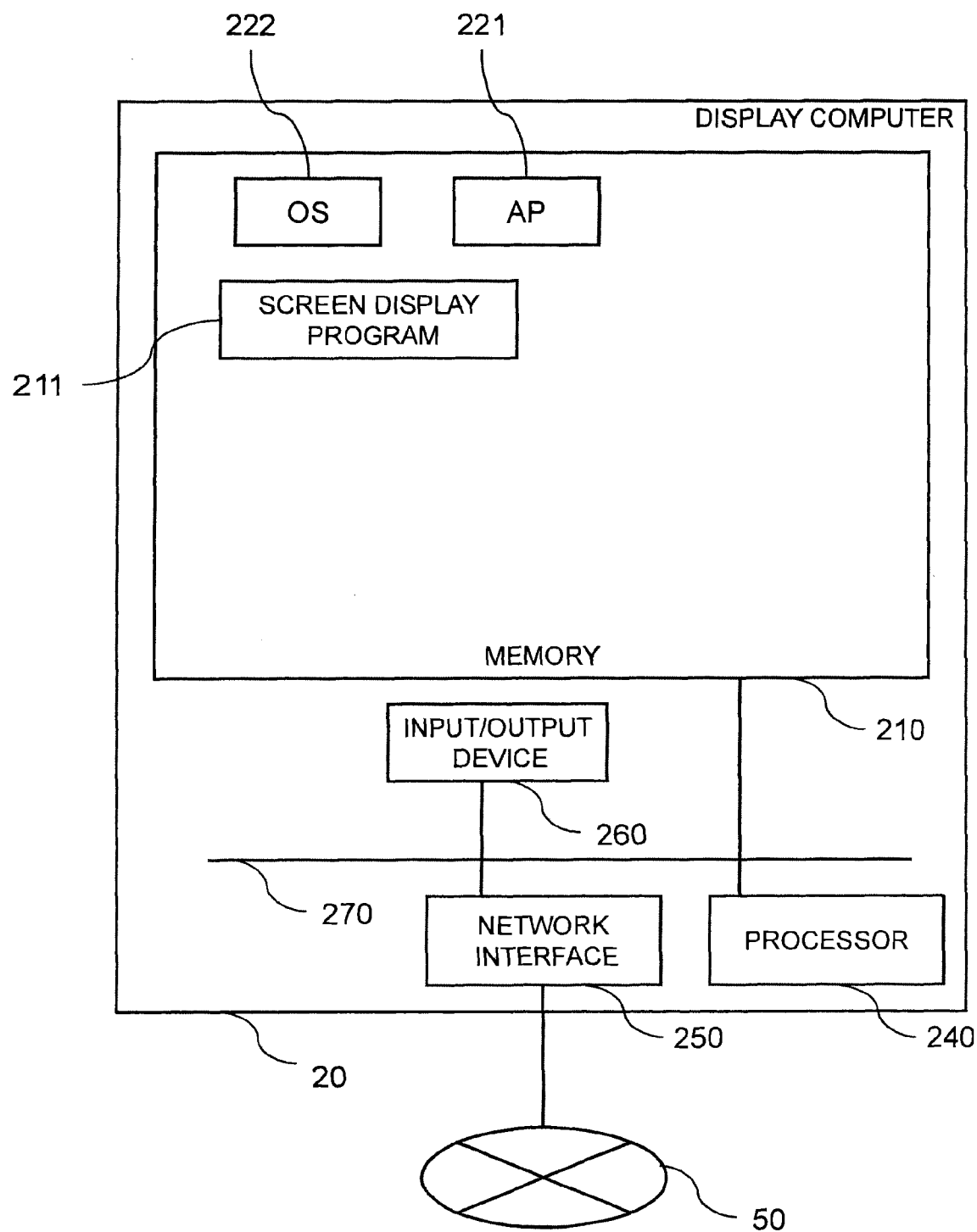
FIG. 3 is a block diagram showing the composition of a display computer.

FIG. 3 shows the composition of the display computer 20.

The display computer 20 includes a memory 210, a processor 240, a network interface 250, and an input/output device 260 (for example, a memory interface like that shown in FIG. 2 has been omitted from the drawing). The memory 210, the processor 240, the network interface 250, and the input/output device 260 are coupled together by an internal network 270.

The processor 240 carries out various processes by executing programs stored in the memory 210.

Programs that are executed by the processor 240, and information that is needed by the processor 240 are stored in the memory 210. Specifically, for example, the memory 210 stores a screen display program 211. In addition, the memory 210 also stores an application program (AP below) 221 and an OS (Operating System) 222. The AP 221 is a program for realizing a variety of processing. For example, the AP 221 provided WEB client functions. The OS 222 is a program for controlling all the processing of the display computer 20.

The screen display program 211 displays information on the input/output device 260, for example, a display device.

The network interface 250 exchanges data via the network 50 with another computer (for example, the management server 10).

An example of the input/output device 260 may be a display, a keyboard, and a pointer device, but it may also be a device other than these. Also, as an alternative to the input/output device 260, a serial interface or an Ethernet interface may be used as an input/output device, and a display computer including a display, a keyboard, or a pointer device may be coupled to this interface. The display computer 20 may receive display information from the management computer 10, and may send input information to the management server 10.

The management server 10 may comprise a first and a second computer, the first computer may execute the topology application program 121, the rule matching analysis program 122, and the creation program 123, and the second computer may execute the context matching analysis program 124 and the failure record management program 125. In accordance with this, the first computer may comprise the server information 111, the switch information 121, the storage information 113, the topology information 114, the meta RCA rule information 115, and the expanded RCA rule information 116, and the second computer may comprise the event information 117 and the failure record information 119.

<1-1: Definition of Terms>

The meanings of the terminology used in the explanation of the Examples will be described below.

The "event" is an operational status-changing event that occurs in the monitoring target node 30.

The "event record" is information for identifying the event. The event record, for example, includes an event type, which is information that shows the type of the event, an identifier of a generation-source monitoring target node 30, information denoting the details of the event, and information denoting the date and time that the event occurred. There is one event record per event.

"RCA" is the acronym for Root Cause Analysis, and is a function for identifying a monitoring target node as the root cause of an event based on the event record of the monitoring target node (for example, the server, the switch, or the storage apparatus).

The "meta RCA rule" defines a certain failure, and an event group that is assumed to have generated this failure. The meta RCA rule is used in accordance with RCA. Using the meta RCA rule makes it possible to derive from an event group a failure that is the root cause thereof. The meta RCA rule is information (meta information) that does not include topology information denoting the topology comprised from one or more monitoring target nodes.

The "expanded RCA rule" expands the meta RCA rule for each monitoring target node. It is used in accordance with the RCA.

The "failure analysis context" is information that is used when analyzing a failure. A record inside the meta RCA rule information 115, a record inside the expanded RCA rule information 116, a record inside the server information 111, a record inside the switch information 112, a record inside the storage information 113, and a record inside the topology information 114 are related to the failure analysis context. A detailed explanation will be given below by referring to FIG. 11.

<1-2: Management Server Information>

A variety of information will be explained below, and expressions such as "identifier", "name" and "ID" will be used in doing so, but this is identification information that may be used interchangeably.

<1-2-1: Server Information>

FIG. 4 is a diagram showing the server information 111.

The server information 111 is a table including one record per server (called a server record below). The server record is a single record including as attribute values a server ID 501, a server name 502, a server vendor 503, a server IP address 504, a server OS 505, and a server continuous operation time 506. The information elements 501 through 506 will be explained below by giving a single server (called the "target server" in the explanation of FIG. 4 below) as an example.

The server ID 501 is an identifier that the topology application program 121 has allocated to the target server, which is the monitoring target node 30.

The server name 502 is the computer name of the target server.

The server vendor 503 is the name of the manufacturer of the target server.

The server IP address 504 is an identifier allocated to the target server on the network.

The server OS 505 is the name of the OS installed in the target server.

The server continuous operation time 506 is the time period that the target server has been continuously operating from the time it was last booted up until the present.

In a case where the server information 111 includes attribute values related to the server, a data structure other than a table may be used, and the attribute values may be other than the above-cited attribute values. Further, at least one of the attribute values other than the server ID 501 need not be included in the server information 111.

<1-2-2: Switch Information>

FIG. 5 is a diagram showing the switch information 112.

The switch information 112 is a table including one record per switch (switch record below). The switch record is a record including as attribute values a switch ID 511, a switch name 512, a switch vendor 513, a switch IP address 514, a switch type 515, and a switch continuous operation time 516. The information elements 511 through 516 will be explained below by giving a single switch (called the "target switch" in the explanation of FIG. 5 below) as an example.

The switch ID 511 is an identifier that the topology application program 121 has allocated to the target switch, which is the monitoring target node 30.

The switch name 512 is the computer name of the target switch.

The switch vendor 513 is the name of the manufacturer of the target switch.

The switch IP address 514 is an identifier allocated to the target switch on the network.

The switch type 515 is the model name of the target switch.

The switch continuous operation time 516 is the time period that the target switch has been continuously operating from the time it was last booted up until the present.

In a case where the switch information 112 includes attribute values related to the switch, a data structure other than a table may be used, and the attribute values may be other than the above-cited attribute values. Further, at least one of the attribute values other than the switch ID 511 need not be included in the switch information 112.

<1-2-3: Storage Information>

FIG. 6 is a diagram showing the storage information 113.

The storage information 113 is a table including one record per storage apparatus (storage record below). The storage record is a record including as attribute values a storage ID 521, a storage name 522, a storage vendor 523, a storage IP address 524, a storage firmware 525, and a storage continuous operation time 526. The information elements 521 through 526 will be explained below by giving a single storage apparatus (called the "target storage" in the explanation of FIG. 6 below) as an example.

The storage ID 521 is an identifier that the topology application program 121 has allocated to the target storage, which is the monitoring target node 30.

The storage name 522 is the computer name of the target storage.

The storage vendor 523 is the name of the manufacturer of the target storage.

The storage IP address 524 is an identifier allocated to the target storage on the network.

The storage firmware 525 is the name of the firmware installed in the target storage.

The storage continuous operation time 526 is the time period that the target storage has been continuously operating from the time it was last booted up until the present.

In a case where the storage information 113 includes attribute values related to the storage apparatus, a data structure other than a table may be used, and the attribute values may be other than the above-cited attribute values. Further, at least one of the attribute values other than the storage ID 521 need not be included in the storage information 113.

<1-2-4: Topology Information>

FIG. 7 is a diagram showing the topology information 114.

The topology information 114 is a table including one record per topology (topology record below). The topology record is a record including as attribute values a topology ID 531, a server ID 532, a switch ID 533, and a storage ID 534. The information elements 531 through 534 will be explained below by giving a single topology (called the "target topology" in the explanation of FIG. 7 below) as an example.

The topology ID 531 is the identifier of the target topology. The "topology" is the coupling mode of the monitoring target nodes 30, in other words, the combination of monitoring target nodes 30. Specifically, topology is defined as the types and alignment of the monitoring target nodes.

The server ID 532 is the server ID 501 of the target topology server.

The switch ID 533 is the switch ID 511 of the target topology switch.

The storage ID 534 is the storage ID 521 of the target topology storage apparatus.

In a case where the topology information 114 includes attribute values related to the coupling mode of the monitoring target nodes 30, a data structure other than a table may be used, and the attribute values may be other than the above-cited attribute values. In this example, the topology is typically a coupling mode in which the server (computer) is coupled to the storage apparatus by way of the switch (network switch). According to a topology like this, the server issues an I/O command (either a write command or a read command) specifying a logical volume to be provided from the storage apparatus. The I/O command reaches the storage apparatus via the switch. The storage apparatus carries out the I/O in accordance with this I/O command with respect to the logical volume specified in this command.

<1-2-5: Meta RCA Rule Information>

FIG. 8 is a diagram showing the meta RCA rule information 115.

The meta RCA rule information 115 is a table including one record per meta RCA rule (meta RCA record below). The meta RCA record is a record including as attribute values a meta RCA rule ID 541, a server event 542, a switch event 543, a storage event 544, a cause node 545, and a cause 546. The information elements 541 through 546 will be explained below by giving a single meta RCA rule (called the "target meta RCA rule" in the explanation of FIG. 8 below) as an example.

The meta RCA rule ID 541 is an identifier that the rule matching analysis program 122 has allocated to the target meta RCA rule.

The server event 542 is information denoting the details of an event in the target meta RCA rule server.

The switch event 543 is information denoting the details of an event in the target meta RCA rule switch.

The storage event 544 is information denoting the details of an event in the target meta RCA rule storage apparatus.

The cause node 545 is information denoting the type of node that is the root cause of the target meta RCA rule event.

The cause 546 is information denoting the details of the root cause of the target meta RCA rule event. The combination of the cause 546 with the above-mentioned cause node 545 expresses the root cause of the event group.

In a case where the meta RCA rule information 115 includes attribute values related to the meta RCA rule, a data structure other than the table may be used, and the attribute values may be other than the above-listed attribute values.

<1-2-6: Expanded RCA Rule Information>

FIG. 9 is a diagram showing the expanded RCA rule information 116.

The expanded RCA rule information 116 is a table including one record per expanded RCA rule (expanded RCA record below). The expanded RCA record is a record including as attribute values an expanded RCA rule ID 551, a meta RCA rule ID 552, a topology ID 553, a cause node ID 554, and a cause details 555. The information elements 551 through 555 will be explained below by giving a single expanded RCA rule (called the "target expanded RCA rule" in the explanation of FIG. 9 below) as an example.

The expanded RCA rule ID 551 is an identifier that the rule matching analysis program 122 has allocated to the target expanded RCA rule.

The meta RCA rule ID 552 is meta RCA rule ID 541 of the meta RCA rule to which the target expanded RCA rule belongs.

The topology ID 553 is the topology ID 531 of the topology to which the target expanded RCA rule belongs.

The cause node ID 554 is the target expanded RCA rule server ID 501, switch ID 511 or storage ID 521 for identifying the monitoring target node 30 that is the root cause.

The cause details 555 is the target expanded RCA rule cause 546 denoting the nature of the root cause.

In a case where the expanded RCA rule information 116 includes attribute values related to the expanded RCA rule, a data structure other than the table may be used, and the attribute values may be other than the above-cited attribute values.

<1-2-7: Event Information>

FIG. 10 is a diagram showing the event information 117.

The event information 117 is a table including one event record per event. The event record is a record including as attribute values an event ID 561, an event type 562, a target node type 563, a target node ID 564, an event details 565, an occurrence date/time 566, and a status 567. The information elements 561 through 567 will be explained below by giving a single event (called the "target event" in the explanation of FIG. 10 below) as an example.

The event ID 561 is an identifier that the rule matching analysis program 122 has allocated to the event record of the target event.

The event type 562 is information denoting the type of the target event. The specific value of the event type 562, for example, may be "Critical", "Warning" or "Information".

The target node type 563 is information denoting the type of the node (for example, a server, a switch or a storage apparatus) of the monitoring target node 30, which is the generation-source of the target event.

The target node ID 564 is the server ID 501, the switch ID 511 or the storage ID 521 denoting the monitoring target node 30 that is the generation-source of the target event.

The event details 565 is information denoting the details of the target event.

The occurrence date/time 566 is information denoting the date and time of the occurrence of the target event.

The status 567 is information denoting whether or not the target event has been resolved.

In a case where the event information 117 includes attribute values related to the event, a data structure other than a table may be used, and the attribute values may be other than the above-cited attribute values. Further, at least one of the attribute values other than the event ID 551, the target node ID 564, the event details 565, and the occurrence date/time 566 need not be included in the event information 117.

<1-2-8: Failure Analysis Context>

FIG. 11 is a diagram showing the failure analysis context 120.

The failure analysis context 120 is data including as attribute values a failure analysis context ID 601, a meta RCA rule ID 602, an expanded RCA rule ID 603, a topology ID 604, a server ID 605, a switch ID 606, and a storage ID 607.

The failure analysis context ID 601 is an identifier that the creation program 123 has allocated to this failure analysis context 120.

The meta RCA rule ID 602 is the meta RCA rule ID 541 for identifying the meta RCA rule that is related to this failure analysis context 120.

The expanded RCA rule ID 603 is the expanded RCA rule ID 551 for identifying the expanded RCA rule that is related to this failure analysis context 120.

The topology ID 604 is the topology ID 531 for identifying the topology that is related to this failure analysis context 120.

The server ID 605 is the server ID 501 for identifying the server that is related to this failure analysis context 120.

The switch ID 606 is the switch ID 511 for identifying the switch that is related to this failure analysis context 120.

The storage ID 607 is the storage ID 521 for identifying the storage apparatus that is related to this failure analysis context 120.

The failure analysis context 120 may have attribute values other than the above-cited attribute values.

<1-2-9: Failure Record Information>

FIG. 12A is a diagram showing a failure record entry 1191 of the failure record information 119.

The failure record entry 1191 is data including as the attribute values a failure record ID 701, a meta RCA rule ID 702, an expanded RCA rule ID 703, a topology ID 704, a server ID 705, a switch ID 706, a storage ID 707, a server weight ID 708, a switch weight ID 709, a storage weight ID 710, a cause 711 and a recovery method 712.

The failure record ID 701 is an identifier that the failure record management program 125 has allocated to the failure record entry 1191.

The meta RCA rule ID 702 is the meta RCA rule ID 541 for identifying the meta RCA rule that is related to this failure record entry 1191.

The expanded RCA rule ID 703 is the expanded RCA rule ID 551 for identifying the expanded RCA rule that is related to this failure record entry 1191.

The topology ID 704 is the topology ID 531 for identifying the topology that is related to this failure record entry 1191.

The server ID 705 is the server ID 501 for identifying the server that is related to this failure record entry 1191.

The switch ID 706 is the switch ID 511 for identifying the switch that is related to this failure record entry 1191.

The storage ID 707 is the storage ID 521 for identifying the storage apparatus that is related to this failure record entry 1191.

The server weight ID 708 is the server weight ID 801 (refer to FIG. 12B) for identifying the server weight record that is related to this failure record entry 1191. The server weight record is a record of the server weight information 800.

The switch weight ID 709 is the switch weight ID 811 (refer to FIG. 12C) for identifying the switch weight record that is related to this failure record entry 1191. The switch weight record is a record of the switch weight information 810.

The storage weight ID 710 is the storage weight ID 821 (refer to FIG. 12D) for identifying the storage weight record that is related to this failure record entry 1191. The storage weight record is a record of the storage weight information 820.

The cause 711 is information denoting the cause of the failure corresponding to this failure record entry 1191.

The recovery method 712 is information denoting the method for recovering from the failure corresponding to this failure record entry 1191.

The IDs 702 through 707 of the failure record entry 1191 are replicates of the IDs 602 through 607 of the failure analysis context 120 (Refer to FIG. 11). That is, as described above, the failure record entry 1191 includes the failure analysis context 120. According to FIG. 12A, the failure analysis context ID 601 is not included in the failure record entry 1191, but this ID 601 may be included in this record 1191.

In a case where the failure record information 119 includes attributes related to the failure record, a data structure other than the above-described data structure may be used, and the attribute values may be other than the above-cited attribute values. Further, the server weight ID 708, the switch weight ID 709 or the storage weight ID 710 need not be included in the failure record information 119.

<1-2-10: Server Weight Information>

FIG. 12B is a diagram showing the server weight information 800.

The server weight information 800 is a table including one record per server weight (a server weight record). The server weight record includes as attribute values a server weight ID 801, a server vendor 802, a server IP address 803, a server OS 804, and a server continuous operation time 805. The information elements 801 through 805 will be explained below by giving a single server weight (called the "target server weight" in the explanation of FIG. 12B) as an example.

The server weight ID 801 is an identifier allocated to the target server weight.

The server vendor 802 is one kind of weight belonging to the target server weight, and is a value denoting how much importance is placed on the item server vendor.

The server IP address 803 is one kind of weight belonging to the target server weight, and is a value denoting how much importance is placed on the item server IP address.

The server OS 804 is one kind of weight belonging to the target server weight, and is a value denoting how much importance is placed on the item server OS.

The server continuous operation time 805 is one kind of weight belonging to the target server weight, and is a value denoting how much importance is placed on the item server continuous operation time.

As is clear from the above explanation, the "server weight" is defined as the weight of a plurality of kinds of items related to the server.

In a case where the server weight information 800 includes attributes related to the server weight, a data structure other than the table may be used, and the attribute values may be other than the above-cited attribute values. At least one of the attribute values other than the server weight ID 801 need not be included in the server weight information 800.

<1-2-11: Switch Weight Information>

FIG. 12C is a diagram showing the switch weight information 810.

The switch weight information 810 is a table including one record per switch weight (a switch weight record). The switch weight record includes as attribute values a switch weight ID 811, a switch vendor 812, a switch IP address 813, a switch type 814, and a switch continuous operation time 815. The information elements 811 through 815 will be explained below by giving a single switch weight (called the "target switch weight" in the explanation of FIG. 12C) as an example.

The switch weight ID 811 is an identifier allocated to the target switch weight.

The switch vendor 812 is one kind of weight belonging to the target switch weight, and is a value denoting how much importance is placed on the item switch vendor.

The switch IP address 813 is one kind of weight belonging to the target switch weight, and is a value denoting how much importance is placed on the item switch IP address.

The switch type 814 is one kind of weight belonging to the target switch weight, and is a value denoting how much importance is placed on the item switch type.

The switch continuous operation time 815 is one kind of weight belonging to the target switch weight, and is a value denoting how much importance is placed on the item switch continuous operation time.

As is clear from the above explanation, the "switch weight" is defined as the weight of a plurality of kinds of items related to the switch.

In a case where the switch weight information 810 includes attributes related to the switch weight, a data structure other than the table may be used, and the attribute values may be other than the above-cited attribute values. At least one of the attribute values other then the switch weight ID 811 need not be included in the switch weight information 810.

<1-2-12: Storage Weight Information>

FIG. 12D is a diagram showing the storage weight information 820.

The storage weight information 820 is a table including one record per storage weight (a storage weight record). The storage weight record includes as attribute values a storage weight ID 821, a storage vendor 822, a storage IP address 823, a storage firmware 824, and a storage continuous operation time 825. The information elements 821 through 825 will be explained below by giving a single storage weight (called the "target storage weight" in the explanation of FIG. 12D) as an example.

The storage weight ID 821 is an identifier allocated to the target storage weight.

The storage vendor 822 is one kind of weight belonging to the target storage weight, and is a value denoting how much importance is placed on the item storage vendor.

The storage IP address 823 is one kind of weight belonging to the target storage weight, and is a value denoting how much importance is placed on the item storage IP address.

The storage firmware 824 is one kind of weight belonging to the target storage weight, and is a value denoting how much importance is placed on the item storage firmware.

The storage continuous operation time 825 is one kind of weight belonging to the target storage weight, and is a value denoting how much importance is placed on the item storage continuous operation time.

As is clear from the above explanation, the "storage weight" is defined as the weight of a plurality of kinds of items related to the storage.

In a case where the storage weight information 820 includes attributes related to the storage weight, a data structure other than the table may be used, and the attribute values may be other than the above-cited attribute values. At least one of the attribute values other than the storage weight ID 821 need not be included in the storage weight information 820.

The above-described server weight information 800, switch weight information 810 and storage weight information 820, for example, are included in the failure record information.

<1-2-13: Information Abstractions>

In the following explanation, a topology including a server, a switch and a storage system will be described as an example. However, the present invention is not limited to a topology like this, and another kind of topology is also applicable. For example, a topology including a service provision node apparatus (for example, a storage apparatus) for providing a predetermined network service, and a service utilization node apparatus (for example, a server) for using this predetermined network service may be the monitoring target nodes. When considered from a broad perspective such as this, the respective types of information may comprise the following information.

The server information (refer to FIG. 4), more abstractly stated, is service utilization node apparatus information. The service utilization node apparatus information may comprise the information (a1) through (a3) below:

(a1) a network identifier such as the IP address of the service utilization node apparatus;

(a2) information denoting the composition of either the hardware or the software of the relevant node apparatus; and (a3) information denoting the configuration details.

The switch information (refer to FIG. 5), more abstractly stated, is relay device information (or relay node apparatus information). The relay device information may comprise the information (b1) and (b2) below:

(b1) information denoting the composition of either the hardware or the software of the node apparatus (for example, the switch) that serves as the go between for communications between the service utilization node apparatus and the service provision node apparatus; and (b2) information denoting the configuration details.

The storage information (refer to FIG. 6), more abstractly stated, is service provision node apparatus information. The service provision node apparatus information may comprise the information (c1) through (c3) below:

(c1) a network identifier such as the IP address of the service provision node apparatus;

(c2) information denoting the composition of either the hardware or the software of the relevant node apparatus; and
(c3) information denoting the configuration details. The service provision node apparatus may also comprise information denoting the kind of network service being provided by the service utilization node apparatus.

The topology information (refer to FIG. 7) may comprise information denoting the set (or corresponding relationship) of the service utilization node apparatus identifier and the identifier of the service provision node apparatus that the relevant service utilization node apparatus uses. Furthermore, in a case where one or more relay devices are interposed when the service utilization node apparatus is communicating with the relevant service utilization node apparatus, the topology information may also comprise the identifiers of these one or more relay devices.

The meta RCA rule information (refer to FIG. 8) may comprise the information (d1) and (d2) below for each network service that the management server targets for monitoring:
(d1) information denoting the combination of a first event type capable of occurring in the service utilization node apparatus (the service utilization node apparatus-generated event) and a second event type capable of occurring in the service provision node apparatus (or the relay device) (the service provision node apparatus-generated event); and
(d2) information representing the cause (or the cause type) capable of occurring in either the service provision node apparatus or the relay device, which may be determined as the cause (or inferred as the cause) in a case where the first event and the second event have occurred.

The expanded RCA rule information (refer to FIG. 9) may comprise the information (e1) through (e3) below for each monitoring target node that either utilizes or provides the network service:
(e1) information denoting a combination of the first event type capable of occurring in the node apparatus that is the service utilization node apparatus and the identifier of the service utilization node apparatus, and the second event type capable of occurring in the node apparatus that is the service provision node apparatus (or the relay device) and the identifier of the service provision node apparatus (or the relay device);
(e2) the identifier of the service provision node apparatus (or the relay device), which may be determined as the cause (or inferred as the cause) in a case where the first event and the second event have occurred; and
(e3) information representing the cause (or the cause type) that is capable of occurring in the relevant service provision node apparatus (or the relay device).

The failure analysis context (refer to FIG. 11) may comprise the identifier of the meta RCA rule used to identify the root cause of a failure. The failure analysis context may also comprise the identifier of the expanded RCA rule used to identify the root cause of a failure, the topology identifier, and the monitoring target node identifier.

The failure record entry (refer to FIG. 12A) may comprise the content of the failure analysis context and information denoting the method (for example, the recovery steps) for recovering from the failure corresponding to this context. The failure record entry may also comprise either an evaluation value for evaluating the degree of match of the failure analysis context of the record thereof, or the identifier of the information in which this evaluation value is stored.

The server weight information (refer to FIG. 12B) may comprise a value for evaluating the degree of match, which is distributed among the hardware or software composition of the server utilization node apparatus and the elements of the configuration details.

The switch weight information (refer to FIG. 12C) may comprise a value for evaluating the degree of match, which is distributed among the hardware or software composition of the relay device and the elements of the configuration details.

The storage weight information (refer to FIG. 12D) may comprise a value for evaluating the degree of match, which is distributed among the hardware or software composition of the server provision node apparatus and the elements of the configuration details.

<1-3: Expanded RCA Rule Creation>

Figure 13:
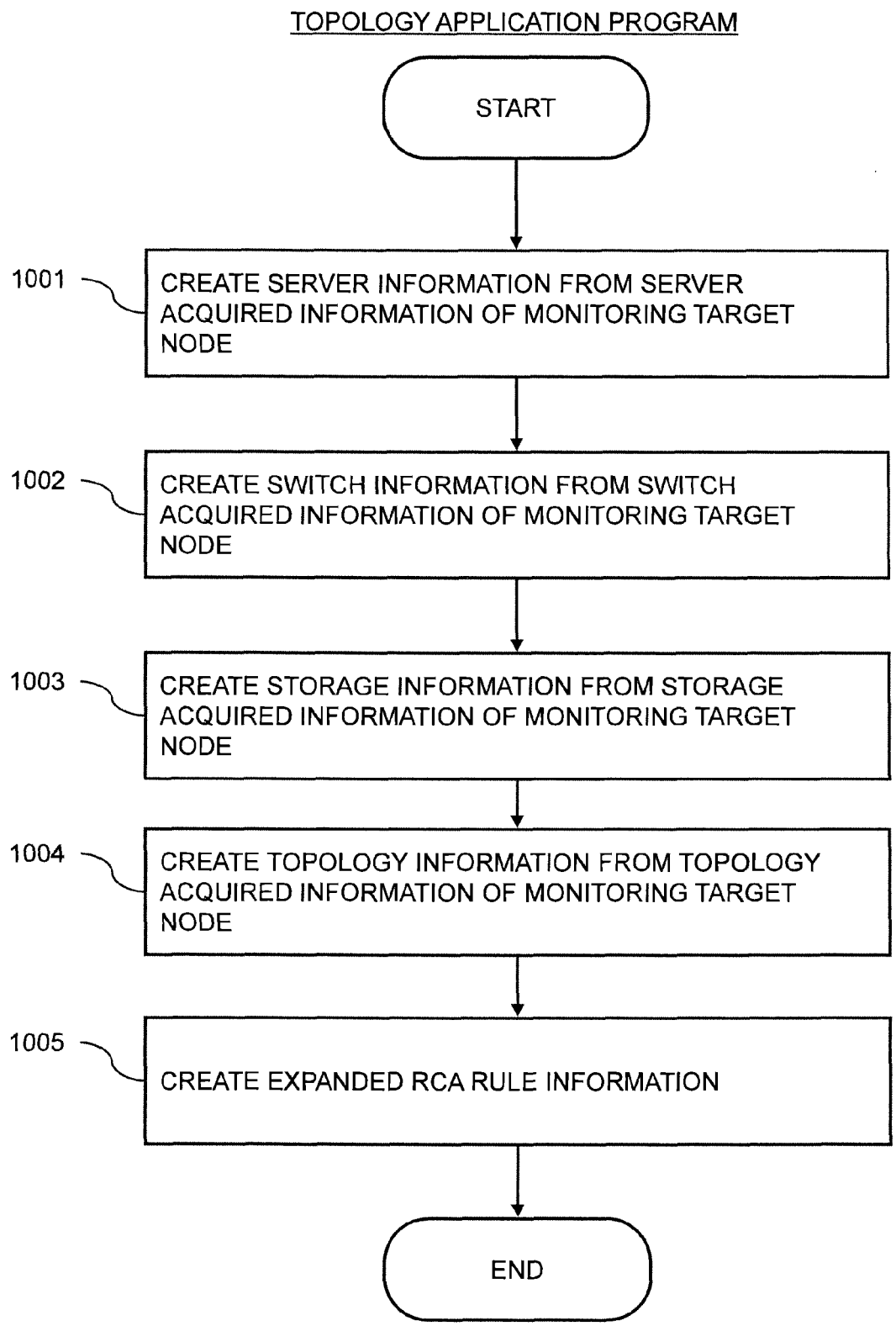
FIG. 13 is a processing flow for creating an expanded RCA rule.

FIG. 13 shows a processing flow for creating the expanded RCA rule.

(Step 1001) The topology application program 121 acquires information from the monitoring target node 30 by way of the network 50. When the monitoring target node 30 is a server, information including the server name, the server vendor name, the server IP address, the server OS name, and the server continuous operation time (called the acquired server information below) is acquired. The topology application program 121 either creates or updates the server information 111 based on the acquired server information received from each monitoring target node 30 (each server). Specifically, for example, the topology application program 121 carries out the processing of (A) and (B) below:
(A) In a case where the identifier inside the acquired server information is not stored in the server information 111, allocates the server ID 501 (for example, the identifier inside the acquired server information) to the server record (called the "target server record" in the explanation of FIG. 13 below) inside the server information 111 corresponding to this acquired server information, and stores this server ID 501 in the target server record; and
(B) stores the server name 502, the vendor name 503, the IP address 504, the OS name 505 and the continuous operation time 506 inside the acquired server information in the target server record.

In a case where the server information 111 is able to be updated, the data structure of the acquired server information is not limited to the above-mentioned structure. Further, Step 1001 may be omitted for a monitoring target node that has been shown beforehand not to be a server.

(Step 1002) The topology application program 121 acquires information from the monitoring target node 30 by way of the network 50. When the monitoring target node 30 is a switch, information including the switch name, the switch vendor name, the switch IP address, the switch type, and the switch continuous operation time (called the acquired switch information below) is acquired. The topology application program 121 either creates or updates the switch information 112 based on the acquired switch information received from each monitoring target node 30 (each switch). Specifically, for example, the topology application program 121 carries out the processing of (A) and (B) below:
(A) In a case where the identifier inside the acquired switch information is not stored in the switch information 112, allocates the switch ID 511 (for example, the identifier inside the acquired switch information) to the switch record (called the "target switch record" in the explanation of FIG. 13 below) inside the switch information 112 corresponding to this acquired switch information, and stores this switch ID 511 in the target switch record; and (B) stores the switch name 512, the vendor name 513, the IP address 514, the type 515 and the continuous operation time 516 of the acquired switch information in the target switch record.

In a case where the switch information 112 is able to be updated, the data structure of the acquired switch information is not limited to the above-mentioned structure. Further, Step 1002 may be omitted for a monitoring target node that has been shown beforehand not to be a switch.

(Step 1003) The topology application program 121 acquires information from the monitoring target node 30 by way of the network 50. When the monitoring target node 30 is a storage apparatus, information including the storage name, the storage vendor name, the storage IP address, the storage firmware name, and the storage continuous operation time (called the acquired storage information below) is acquired. The topology application program 121 either creates or updates the storage information 113 based on the acquired storage information received from each monitoring target node 30 (each storage apparatus). Specifically, for example, the topology application program 121 carries out the processing of (A) and (B) below:

(A) In a case where the identifier inside the acquired storage information is not stored in the storage information 113, allocates the storage ID 521 (for example, the identifier inside the acquired storage information) to the storage record (called the "target storage record" in the explanation of FIG. 13 below) inside the storage information 113 corresponding to this acquired storage information, and stores this storage ID 521 in the target storage record; and (B) stores the storage name 522, the vendor name 523, the IP address 524, the firmware name 525 and the continuous operation time 526 of the acquired storage information in the target storage record.

In a case where the storage information 112 is able to be updated, the data structure of the acquired storage information is not limited to the above-mentioned structure. Further, Step 1003 may be omitted for a monitoring target node that has been shown beforehand not to be a storage.

(Step 1004) The topology application program 121 receives an acquired topology information of the monitoring target node 30 via the network 50. Examples of the acquired topology information include the switch ID, and the respective IDs of the server and storage apparatus coupled to this switch. Specifically, for example, the topology application program 121 carries out the processing of (A) and (B) below:

(A) In a case where the identifier inside the acquired topology information is not stored in the topology information 114, allocates the topology ID 531 (for example, the identifier inside the acquired topology information) to the topology record (called the "target topology record" in the explanation of FIG. 13 below) inside the topology information 114 corresponding to this acquired topology information, and stores this topology ID 321 in the target topology record; and (B) stores the switch ID 533, the server ID 532, and the storage ID 534 of the acquired topology information in the target topology record.

In a case where the topology information 114 is able to be updated, the data structure of the acquired topology information is not limited to the above-mentioned structure. Further, Step 1004 may be omitted for monitoring target nodes that have been clearly shown beforehand not to be a switch, a server and a storage apparatus. The topology code may also be updated as follows. That is, coupling-destination information denoting which monitoring target nodes are directly coupled is acquired from each monitoring target node, and, in addition, bus information denoting which logical volume is accessed from which server is acquired from either the server or the storage apparatus, and the target topology code may be updated based on the coupling-destination information and bus information.

(Step 1005) The topology application program 121 creates the expanded RCA rule information 116 based on the topology information 114 and the meta RCA rule information 115. More specifically, this program 121 carries out the processing of (x) and (y) below:

(x) creates combinations of all the topology IDs 531 inside the topology information 114 and all the meta RCA rule IDs 541 inside the meta RCA rule information 115 (for example, creates six (2×3=6) combinations in a case where there are two topology IDs 531 and three meta RCA rule IDs 541); and (y) allocates an expanded RCA rule ID 551 for each combination, and, in addition, stores the expanded RCA rule IDs 551 and the topology IDs and meta RCA rule IDs that comprise the combinations in an expanded RCA record (a record inside the expanded RCA rule information 116). The processing of (x) above need not be carried out for a topology ID of a topology including a combination of a storage apparatus and a server that will not actually be used. Similarly, expanded RCA rule information may be created in accordance with another process. More abstractly stated, for example, the topology application program 121 is able to carry out (Step A) through (Step D) below:

(Step A) acquire from the monitoring target node as acquired node information at least one value included in each of the above-mentioned acquired information;

(Step B) based on the acquired node information, update the service utilization node apparatus information, the service provision node apparatus information or the relay node apparatus information;

(Step C) based on the acquired topology information, include the correspondence between the identifier of the service provision node apparatus for a predetermined network service and the identifier of the service utilization node apparatus that makes use of the relevant node apparatus in the topology information; and (Step D) based on the topology information and the meta RCA rule information, updates the expanded RCA rule information.

According to the example described above, one record of the expanded RCA rule information is created from one record of the meta RCA rule information, but the present invention is not limited to this. One example is multistep reasoning. In the case of multistep reasoning, it is possible to derive a new rule from a plurality of rules using a syllogism. In accordance with this, the expanded RCA rule information may actually be created using the topology information and the records of one or more meta RCA rules in addition to the meta RCA rule ID of the expanded RCA rule information. The following is an example of deriving a new rule from a plurality of rules.

(First Meta RCA Rule) In a case where a first type event (called event A below) occurring in the service utilization node apparatus and a second type event (called event B below) occurring in the service provision node apparatus are detected for a first network service (for example, WWW (World Wide Web)), the root cause of event A is the origin of event B.

(Second Meta RCA Rule) In a case where a third type event (called event C below) occurring in the service utilization node apparatus and a fourth type event (called event D below) occurring in the service provision node apparatus are detected for a second network service (for example, DNS (Domain Name System)), the root cause of event C is the origin of event D.

(First Topology Information) A node apparatus A is the service utilization node apparatus, and a node apparatus B is the service provision node apparatus for the first network service.

(Second Topology Information) The node apparatus B is the service utilization node apparatus, and a node apparatus C is the service provision node apparatus for the second network service.

(Third Topology Information) The first network service of the node apparatus B is provided using the second network service.

(First Expanded RCA Rule to be Created) In a case where the event A occurring in the node apparatus A and the event B occurring in the node apparatus B have been detected, the root cause of the event A that occurred in the node apparatus A is the origin of the event B in the node apparatus B.

(Second Expanded RCA Rule to be Created) In a case where the event C occurring in the node apparatus B and the event D occurring in the node apparatus C have been detected, the root cause of the event C that occurred in the node apparatus B is the origin of the event D in the node apparatus C.

(Third Expanded RCA Rule to be Created) In a case where the event A occurring in the node apparatus A and the event D occurring in the node apparatus C have been detected, the root cause of the event A that occurred in the node apparatus A is the origin of the event D in the node apparatus C.

In a case where multistep reasoning is used, information denoting either the network service or a dependence relation between logical targets may also be included in the topology information in addition to the dependence relation between the physical devices (for example, between the nodes). The above-mentioned third topology information is an example of this.

In the expanded RCA rule information of FIG. 9, the identification of the root cause is performed on the basis of the meta RCA rule ID 552 and the topology ID 553 while referring to the meta RCA rule expressed in the meta RCA rule information 115 and the topology expressed in the topology information. However, as an alternate process, information denoting a rule developed on the basis of the meta RCA rule and the topology may be included in the expanded RCA rule information. According to this scheme, the identification of the root cause is performed more rapidly despite an increase in the amount of the memory 110 of the management server 10 that is consumed. However, due to the need to identify the meta RCA rule from the expanded RCA rule, in either case, the meta RCA rule ID 552 is required in the expanded RCA rule information.

<1-4: Event Detection Process>

Figure 14:
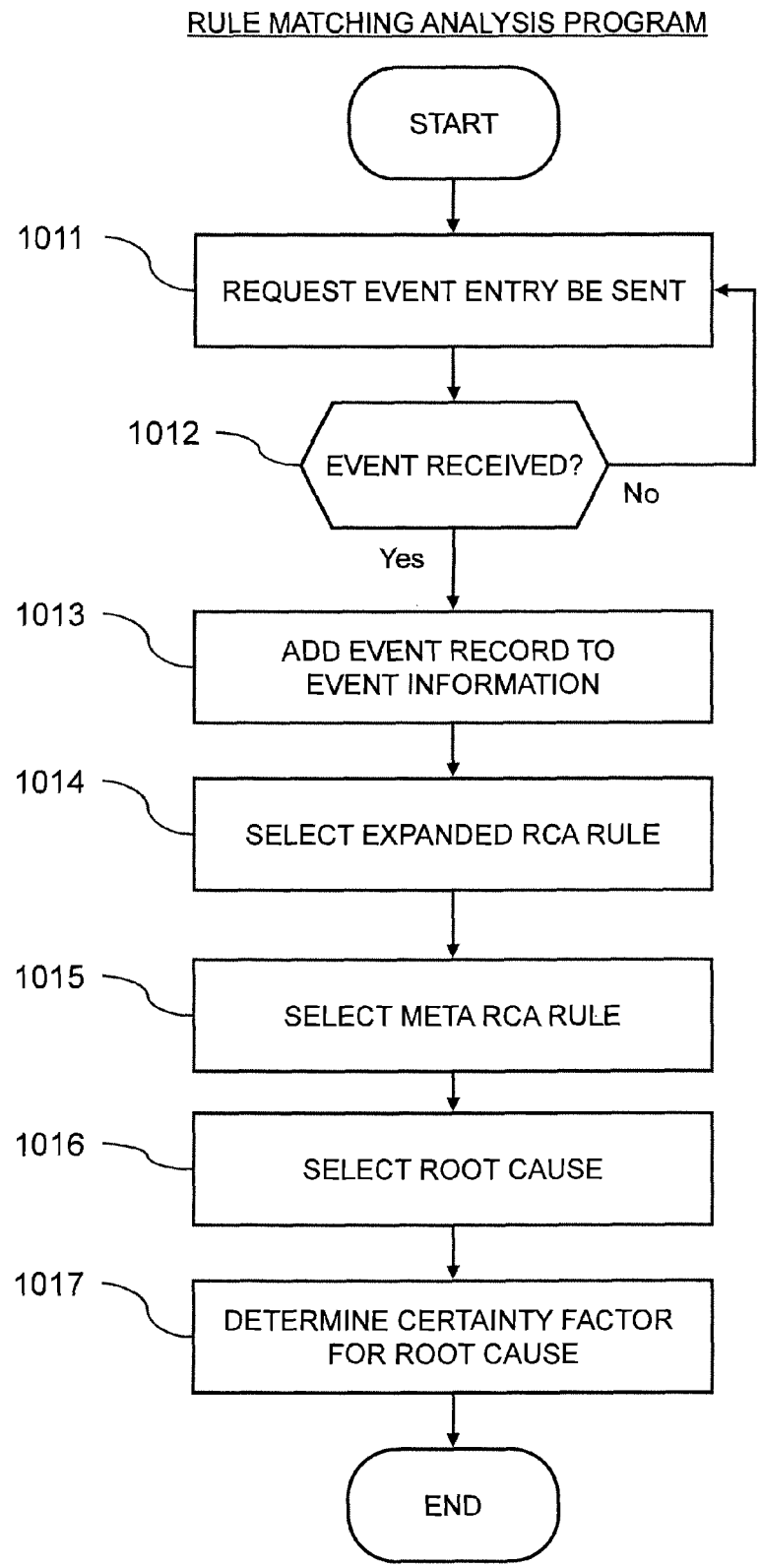
FIG. 14 is a processing flow for determining a root cause candidate and the certainty factor thereof.

FIG. 14 shows a processing flow from the detection of an event until the identification of the root cause of the event. This processing flow is executed either at a fixed time interval (for example, every 10 minutes) or simply repeatedly.

(Step 1011) The program 122 requests the event entry, which is information including an event type, a target node type, a target node ID, an event details, and an occurrence date/time for all the monitoring target nodes 30. The respective information elements included in the event entry are as follows:

(Event Type) This shows the type (for example, Critical, Warning, Information) of the event that belongs to the event entry;

(Target Node Type) This shows the type (for example, a server, a switch, or a storage apparatus) of the node of the monitoring target node 30, which is the target of the event that occurred;

(Target Node ID) This is the identifier (the server ID 501, the switch ID 511 or the storage ID 521) representing the monitoring target node 30 in which the event occurred;

(Event Details) This is the details of the event that occurred; and (Occurrence Date/Time) This is the date and time that the event occurred.

The event entry may be sent from the monitoring target node 30 without having received a request from the rule matching analysis program 122. Further, the information denoting the occurrence date/time does not necessarily have to be included. In accordance with this, the management server 10 is able to use the date and time at which the event entry was received in place of the occurrence date/time.

(Step 1012) In a case where an event entry was received from the monitoring target node 30 in Step 1011, the rule matching analysis program 122 carries out Step 1013. In a case where an event entry was not received from the monitoring target node 30, Step 1011 is carried out.

(Step 1013) The rule matching analysis program 122 adds information to the event information 117 based on the event entry. Specifically, for example, the program 122 carries out the processing of (A) through (C) below:

(A) Acquires a new event ID 561, and stores this ID 561 in a blank record (called the "target record" in the explanation of Step 1013 below) inside the event information 117;

(B) stores the event type, the target node type, the target node ID, the event details, and the occurrence date/time in the target record; and (C) stores a value called "pending" in the target record as the status 567.

In a case where the event entry is able to either add or update an event record of the event information 117 (a record inside the event information 117), another value may also be included.

(Step 1014) The rule matching analysis program 122 identifies an expanded RCA record (a record inside the expanded RCA rule information 116) related to the event record including the status 567 denoting "pending" based on the event record including the status 567 denoting "pending", the topology information 114, and the expanded RCA rule information 116. Specifically, for example, the rule matching analysis program 122 selects the processing of (A) through (H) below:

(A) Identifies, from among the event records for which the status 556 is "pending", the event record (a first event record) with the oldest occurrence date/time 565;

(B) based on the first event record identified in the previous step, identifies one or more second event records (the difference between the occurrence date/time 565 inside the first event record and the occurrence date/time 565 inside the second event record is within a predetermined time period (for example, around 10 minutes));

(C) refers to the target node type 563 inside all the second event records obtained in the above (B), and based on all the target node IDs inside these second event records, creates combinations (called a node ID set below) including all the target node IDs having different target node types (for example, in a case where there are four event records, two of which records relate to the servers A and B and the remaining two of which records relate to the switches A and B, creates the four node ID sets of server A ID—switch A ID, server A ID—switch B ID, server B ID—switch A ID, and server B ID—switch B ID.);

(D-1) in a case where there is a second event record including a target node ID that is not included in any of the ID sets obtained in the above (C) (an event record including the status 556 denoting "pending"), identifies the second event entry from thereamong having the oldest occurrence date/time 565, and implements the above (B) by using this second event entry as the above first event entry;

(D-2) in a case where there is a second event record including a target node ID that is not included in any of the ID sets obtained in the above (C) (an event record including the status 556 denoting "pending"), implements the processing of (E) below;

(E) searches for the topology record (record of the topology information 114) that conforms to all of (Condition E1) through (Condition E3) below for each node ID set obtained by the above (D-1) and (D-2):

(Condition E1) includes the server ID 532 that matches the target node ID of the server inside the node ID set;

(Condition E2) includes the switch ID 533 that matches the target node ID of the switch inside this node ID set; and (Condition E3) includes the storage ID 534 that matches the target node ID of the storage apparatus inside this node ID set, and in a case where a topology record like this is found, selects the topology ID 531 including this topology record, and makes this ID 531 correspondent to the node ID set corresponding to this topology record;

(F) searches for the meta RCA record (record of the meta RCA rule information 115) that conforms to all of (Condition F1) through (Condition F3) below for each node ID set (node ID set identified by the topology record conforming to the Conditions E1 through E3) obtained in the above (E):

(Condition F1) includes the server event 542 that matches the event details 564 inside the event record including the target node ID of the server inside the event ID set;

(Condition F2) includes the switch event 543 that matches the event details 564 inside the event record including the target node ID of the switch inside this event ID set; and (Condition F3) includes the storage event 544 that matches the event details 564 inside the event record including the target node ID of the storage apparatus inside this event ID set, and in a case where a meta RCA record like this is found, selects the meta RCA rule ID 541 including this meta RCA record, and makes this ID 541 correspondent to the corresponding node ID set;

(G) performs the processing of (g1) through (g4) below for each node ID set (set to which the meta RCA rule ID 541 has been made correspondent) obtained in the above (F):

(g1) selects the cause node 545 from the meta RCA record including the meta RCA rule ID 541 that was made correspondent to the node ID set;

(g2) identifies the event code including the target node type 563 that matches the selected cause node 545;

(g3) selects the target node ID 564 from the identified event code; and (g4) makes the selected target node ID 564 correspondent to the node ID set in the above (g1); and (H) selects the expanded RCA record (record of the expanded RCA rule information 116) including the elements of the below-mentioned (h1) through (h3):

(h1) the topology ID 553 that matches the topology ID 531 obtained in (E) above;

(h2) the meta RCA rule ID 552 that matches the meta RCA rule ID 541 obtained in (F) above; and (h3) the cause node ID 554 that matches the target node ID 564 obtained in (G) above.

(Step 1015) The rule matching analysis program 122 assembles the plurality of expanded RCA records obtained in Step 1014 into records with a matching meta RCA rule ID 552. In accordance with this, it is possible to form one or a plurality of groups of expanded RCA records having the same meta RCA rule ID 552.

(Step 1016) The program 122 assembles the expanded RCA rule belonging to the group obtained in Step 1015 into records with a matching cause node ID 554. In accordance with this, it is possible to form one or a plurality of subgroups of expanded RCA records having the same cause node ID 554 for a group of expanded RCA records having the same meta RCA rule ID 552. The monitoring target node 30 shown by the cause node ID 554 is a root cause candidate.

(Step 1017) The program 122 calculates the certainty of the root cause candidate obtained in Step 1016 as a certainty factor. As a method for calculating the certainty factor, for example, there is a method that is based on the number of expanded RCA rule records whose cause node IDs 554 match. For example, a certainty factor that corresponds to the number of expanded RCA rule records whose cause node IDs 554 match is allocated to each root cause candidate. The certainty factor allocated to a root cause candidate having a large number of expanded RCA rule records whose cause node IDs 554 match is higher than the certainty factor allocated to a root cause candidate having a small number of such expanded RCA rule records. The certainty factor may also be calculated using another method.

<1-5: Failure Analysis Context Creation>

Figure 15:
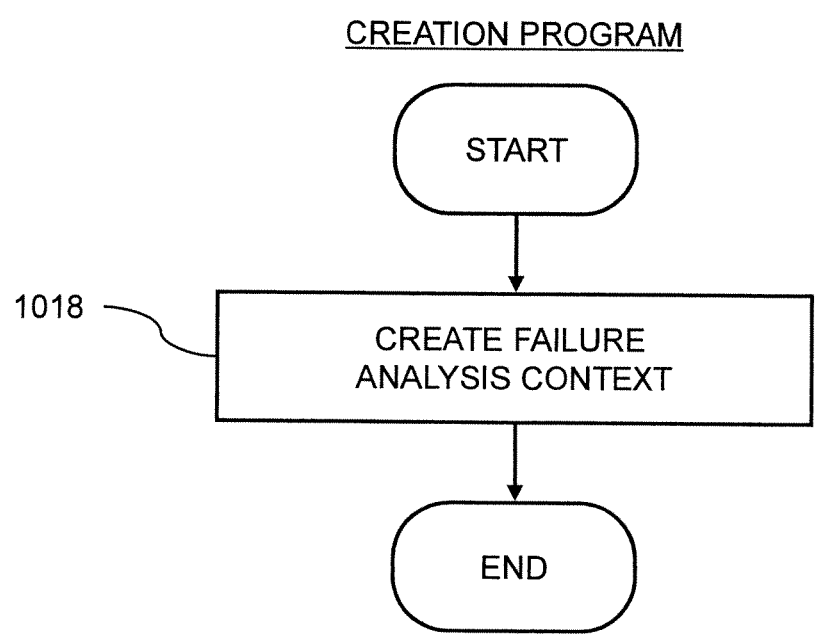
FIG. 15 is a processing flow for creating a failure analysis context.

FIG. 15 is a processing flow for creating the failure analysis context. This flow of processing, for example, starts immediately after Step 1017.

(Step 1018) The creation program 123 creates the failure analysis context 118. Specifically, for example, the creation program 123 carries out the processing of (A) through (G) below:

(A) Includes the meta RCA rule ID 552 obtained in Step 1015 in the failure analysis context;

(B) selects, from among the one or more expanded RCA records including one or more expanded RCA rule IDs 551 obtained in Step 1014, the expanded RCA rule ID 551 from the record including the ID 522 that matches the meta RCA rule ID 552 obtained in (A) above, and includes the selected ID 551 in the failure analysis context;

(C) selects the topology ID 553 from the expanded RCA record including the ID 551 that matches the expanded RCA rule ID 551 (603) obtained in (B) above, and includes this ID 553 in the failure analysis context;

(D) selects the server ID 532 from the topology record including the ID 531 that matches the topology ID 553 (605) obtained in (C) above, and includes this ID 532 in the failure analysis context;

(E) selects the switch ID 533 from the topology record including the ID 531 that matches the topology ID 553 (605) obtained in (C) above, and includes this ID 533 in the failure analysis context;

(F) selects the storage ID 534 from the topology record including the ID 531 that matches the topology ID 553 (605) obtained in (C) above, and includes this ID 534 in the failure analysis context; and (G) the creation program 123 allocates a failure analysis context ID 601, and includes this ID 601 in the failure analysis context.

The failure analysis context 118 may be created using only the failure analysis context ID 601 and the mete RCA rule ID 603.

<1-6: Root Cause Selection and Display>

Figure 16:
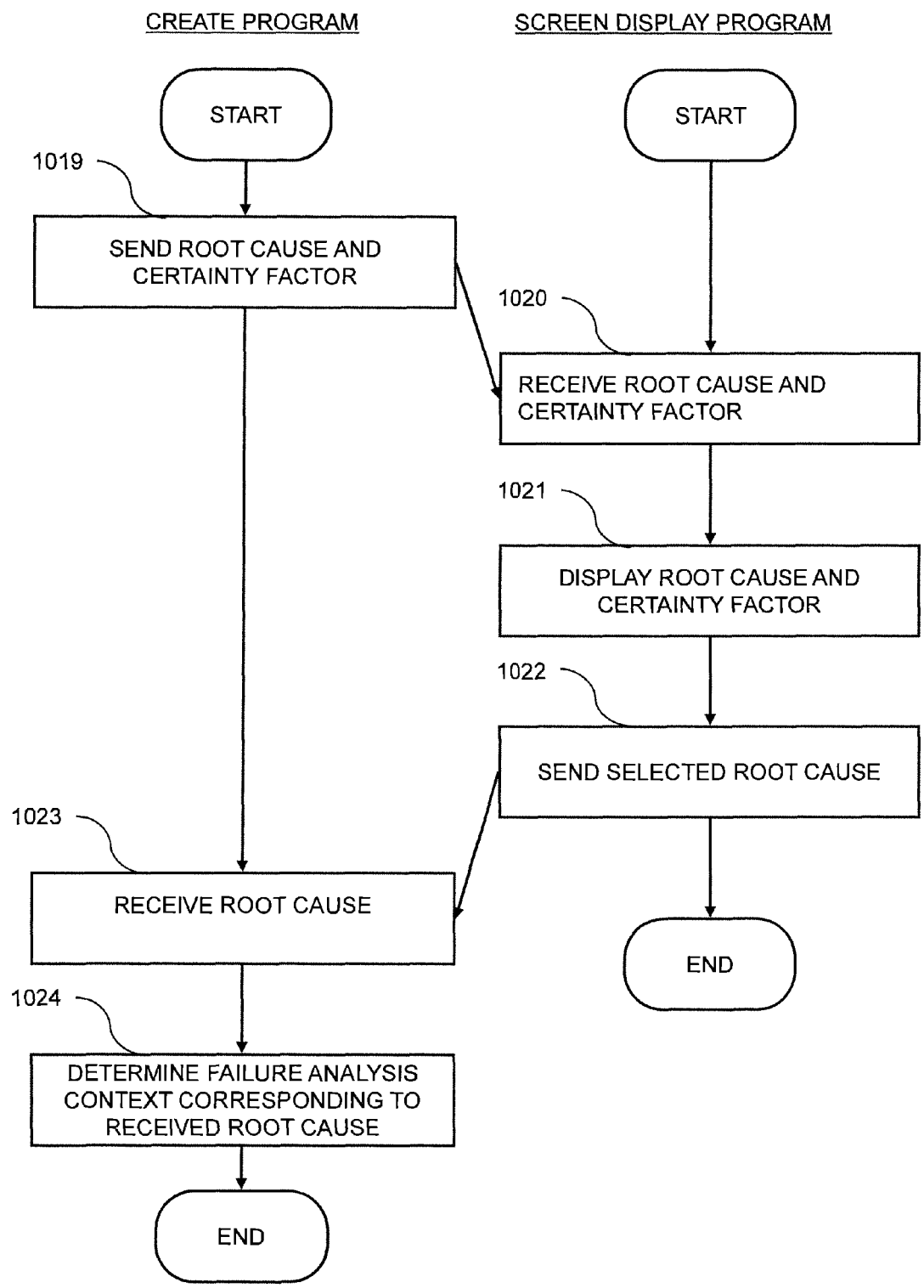
FIG. 16 is a processing flow for selecting a root cause.

FIG. 16 shows the flow of processing for selecting the root cause. This flow of processing, for example, starts immediately after Step 1018.

(Step 1019) The creation program 123 sends to the display computer 20 via the network 50 a first display information including the elements (a) through (c) below:
(a) the server name 502 inside the server record including the server ID 501 that matches the cause node ID 554 in Step 1016, the switch name 512 inside the switch record including the switch ID 511 that matches the cause node ID 554 in Step 1016, or the storage name 522 inside the storage record including the storage ID 521 that matches the cause node ID 554 in Step 1016;
(b) the cause details 555 of the expanded RCA record (the expanded RCA record assembled in Step 1015) corresponding to the cause node ID 554 in (a) above; and
(c) the certainty factor (the certainty factor obtained in Step 1017) corresponding to the cause node ID 554 in (a) above.

(Step 1020) The screen display program 211 receives the first display information sent in Step 1019.

(Step 1021) The screen display program 211 displays the first display information received in Step 1020 on the input/output device 260 (for example, a display device).

FIG. 19 shows a candidate/certainty factor screen 2010. The screen 2010 is an example of a display screen of the first display information.

A candidate ID 2011 is the identifier of a root cause candidate. The candidate ID, for example, is allocated to each root cause candidate by the display program 211.

A cause node name 2012 is an element included in the first display information, and is the server name 502, the switch name 512 or the storage name 522 of the root cause candidate (the monitoring target node 30).

A cause details 2013 is the cause details 555 included in the first display information.

A certainty factor 2014 is the certainty factor included in the first display information.

The explanation will return once again to the FIG. 16.

(Step 1022) The screen display program 211 sends to the management server via the network 50 information (for example, the cause node ID) for identifying the root cause candidate selected by the system administrator using the input/output device 260 (for example, a mouse).

(Step 1023) The creation program 123 receives the information sent in Step 1022.

(Step 1024) The creation program 123 determines the failure analysis context 118 corresponding to the information received in Step 1023. This failure analysis context 118 is the failure analysis context created in Step 1018.

<1-7: Failure Record Registration>

Figure 17:
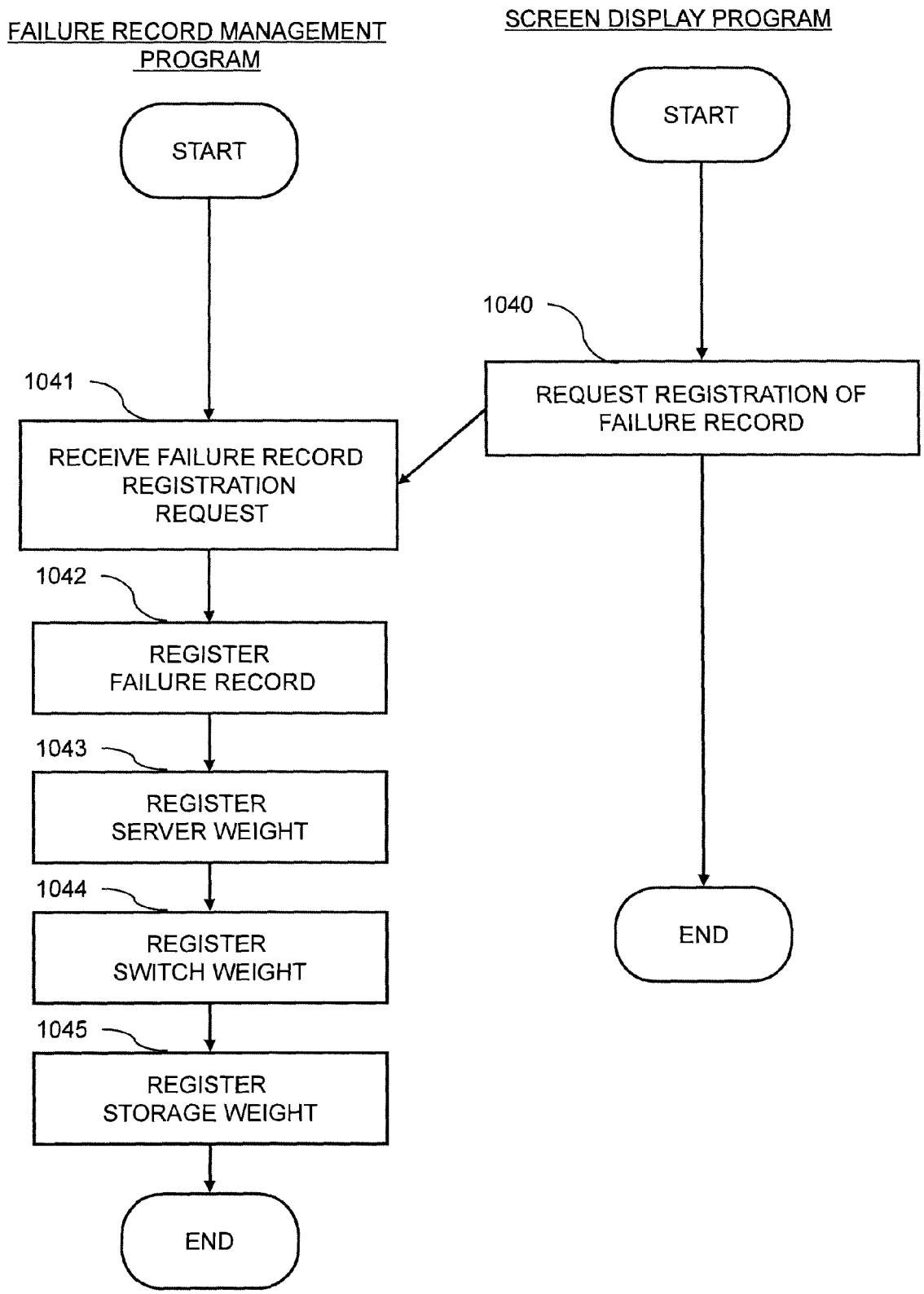
FIG. 17 is a processing flow for registering a failure record.

FIG. 17 shows the flow of processing for registering a failure. In a case where there is 0 failure record entries, this processing flow is started subsequent to the flow of processing of FIG. 16. In a case where there is one or more failure record entries, this processing flow is started after the processing of FIG. 18A has elapsed subsequent to the processing of FIG. 16.

(Step 1040) The display computer 20 displays the registration screen of the failure record.

Figure 21:
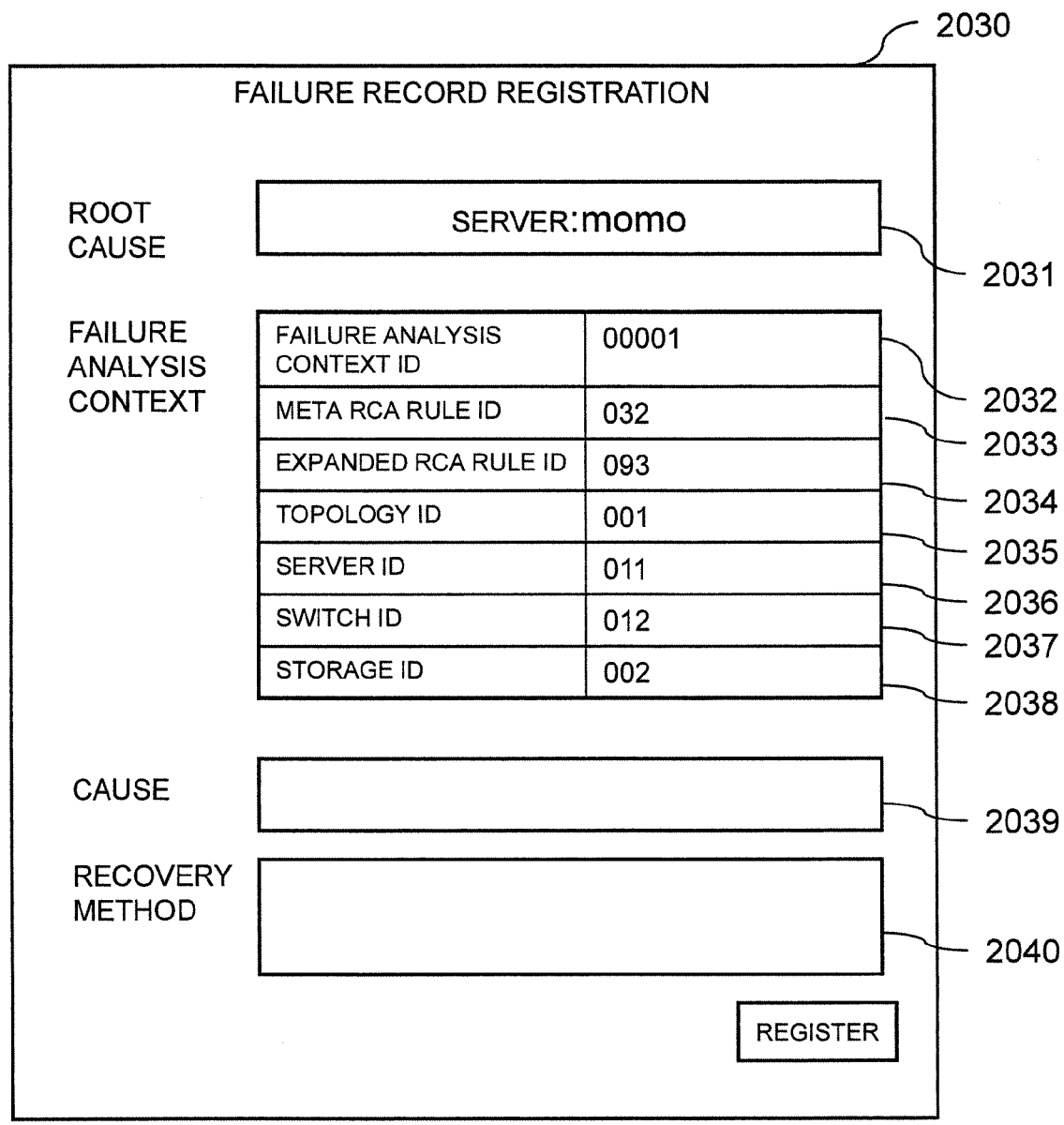
FIG. 21 shows an example of a failure record registration screen.

FIG. 21 shows a registration screen 2030. This screen 2030 is an example of a failure record registration screen.

The root cause 2031 is the server name 502, the switch name 512 or the switch name 522 representing the root cause candidate (monitoring target node 30) corresponding to the cause node ID in Step 1016.

A failure analysis context ID 2032 or a storage ID 2038 is the failure analysis context ID 601 or a storage ID 607 inside the failure analysis context (the context determined in Step 1024) corresponding to the cause node ID in Step 1016. The screen shown in FIG. 19 may be closed from Step 1024 until this step. In accordance with this, the failure analysis context obtained in Step 1024 must be stored beforehand in a storage apparatus such as a memory prior to closing the screen of FIG. 19, and must be read in during this step.

A cause 2039 is a system administrator form for the system administrator to register the details of the cause of the relevant failure in natural language using the input/output device 260.

A recovery method 2040 is a system administrator form for the system administrator to register the details of the method for recovering from the relevant failure in natural language using the input/output device 260.

The system administrator sends the meta RCA rule ID 2033 or the storage ID 2038, the cause 2039, and the restoration method 2040 to the failure record management program 125 by pressing a Register button after inputting to the cause 2039 and the recovery method 2040 columns.

Refer to FIG. 17 once again.

(Step 1041) The failure record management program 125 receives the meta RCA rule ID 2033 or the storage ID 2038, the cause 2039, and the recovery method 2040 sent in Step 1040.

(Step 1042) The failure record management program 125 registers the meta RCA rule ID 2033 or the storage ID 2038, the cause 2039, and the recovery method 2040 sent in Step 1041 in the failure record entry. The program 125 allocates the failure record ID 701 to this record.

(Step 1043) The failure record management program 125 creates a new record in the server weight information 800. An initial value (for example 100) is substituted for the server vendor 802 or the server continuous operation time 805 of this record, and a server weight ID is stored in this record. The initial value may be another value in a case where this value shows the weights of the respective elements.

(Step 1044) The failure record management program 125 creates a new record in the switch weight information 810. An initial value (for example 100) is substituted for the switch vendor 812 or the switch continuous operation time 815 of this record, and a switch weight ID is stored in this record. Another value may be used in a case where this initial value shows the weights of the respective elements.

(Step 1045) The failure record management program 125 creates a new record in the storage weight information 820. An initial value (for example 100) is substituted for the storage vendor 822 or the storage continuous operation time 825 of this record, and a storage weight ID is stored in this record. The initial value may be another value in a case where this initial value shows the weights of the respective elements.

In the explanations of Steps 1043 through 1045, an example of a host-switch-storage is used as the monitoring target nodes combination. However, these explanations may comprise values for evaluating the degree of match between arbitrary elements of the configuration details and either the hardware or software composition of the monitoring target node. Viewed from a broad perspective such as this, there may be a process in Step 1043 through Step 1045 for allocating an evaluation value for failure analysis context matching to arbitrary elements of the configuration details and either the hardware or software composition of the monitoring target node of the failure analysis context.

<1-9: Failure Record Retrieval>

Figure 18A:
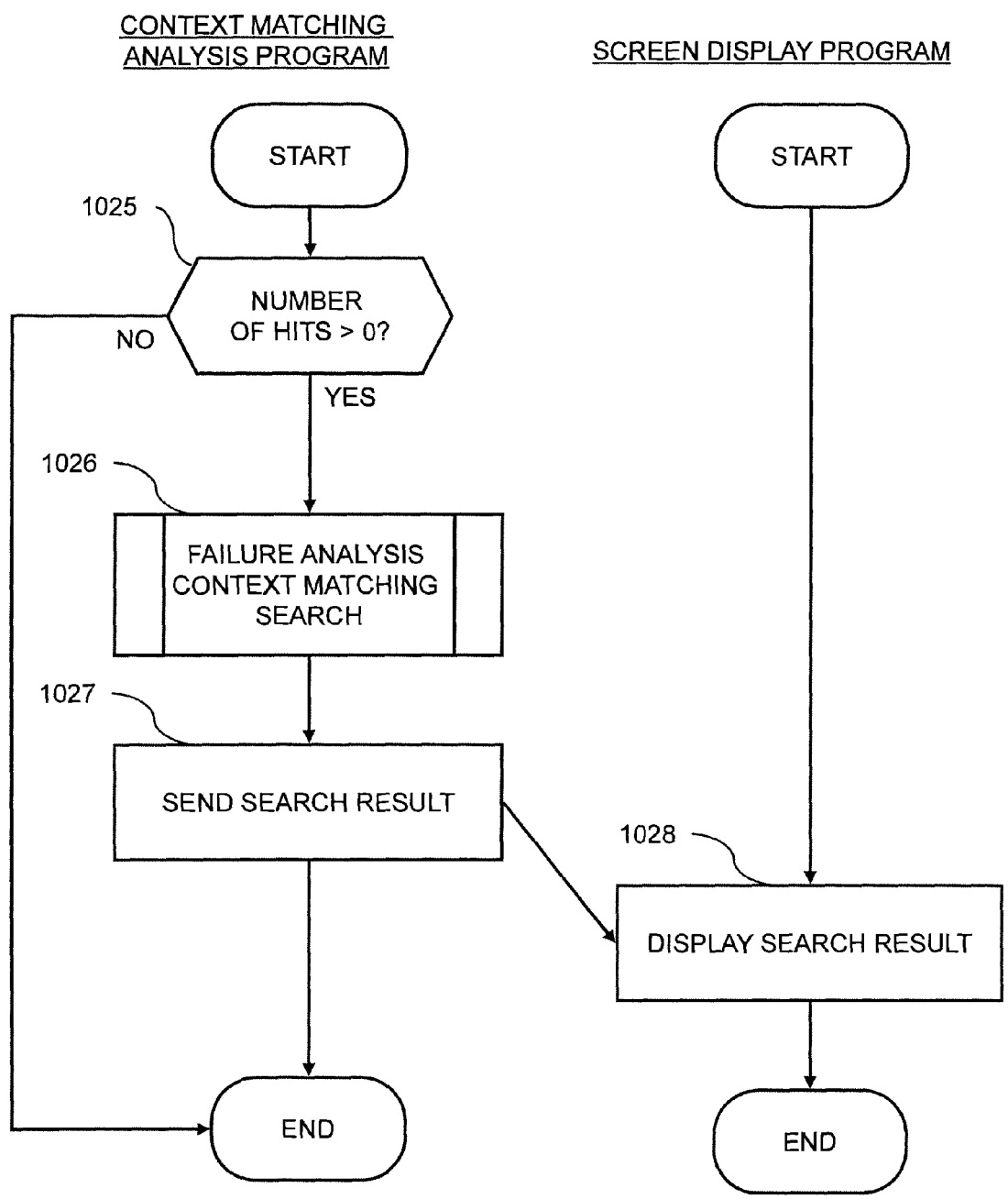
FIG. 18A is a processing flow for matching a failure analysis context.

FIG. 18A is the flow of processing for acquiring the same event and/or the similar event failure record entry from the failure record information.

(Step 1025) The context matching analysis program 124, in a case where the number of failure record entries is 0, ends this flow of processing. In a case where there is one or more failure record entries, the program 124 executes Step 1022.

(Step 1026) The program 124 uses the failure analysis context to search the failure record information. A detailed explanation of Step 1026 will be given below using FIG. 18B.

(Step 1027) The program 124 sends the search result information obtained in Step 1026 to the display computer 20. The search result information, for example, includes the failure record ID 701, the meta RCA rule ID 702, the expanded RCA rule ID 703, the topology ID 704, the server ID 705, the switch ID 706, the storage ID 707, the server weight ID 708, the switch weight ID 709, the storage weight ID 710, the cause 711, the recovery method 712, and a match probability. However, other information may be sent in a case where it is possible to display FIG. 20, which will be described further below.

(Step 1028) The screen display program 211 (the display computer 20) receives the information sent in Step 1027, and displays this information on the input/output device 260 (for example, a display device). In so doing, the program 211 preferentially displays information having a high match probability (for example, the program 211 displays the information in descending order of match probabilities (from the highest to the lowest match probability)).

FIG. 20 shows the search result screen 2020 that is displayed in Step 1028. This screen 2020 is an example of the search results screen.

A record ID is an identifier (for example, a serial number) allocated to a search record that resulted in a hit.

A failure record ID 2022 is the failure record ID 701 in the failure record entry that resulted in a hit.

A failure record node name 2023 is the server name 502 inside the server record, the switch name 512 inside the switch record, or the storage name 522 inside the storage record. The records including these elements 502, 512 or 522 comprise an ID that matches with the cause node ID 554. This cause node ID 554 is inside the expanded RCA record including the expanded RCA rule ID 551 that matches the expanded RCA rule ID 703 in the failure record entry that resulted in a hit.

A cause 2024 is the cause 711 in the failure record entry that resulted in a hit.

A recovery method 2025 is the recovery method 712 in the failure record entry that resulted in a hit.

A match probability 2026 shows the probability of a match that was sent by the context matching analysis program 124 in Step 1027. The search results are displayed in descending order with respect to the match probability.

Other types of information elements related to the failure record search results may be displayed in the search result screen either instead of or in addition to the information elements shown in FIG. 20.

When the system administrator selects an arbitrary row (a failure record) from the table in the screen shown in FIG. 20, there is displayed a screen for comparing the failure shown in the selected failure record against the failure that has occurred this time.

Figure 24B:
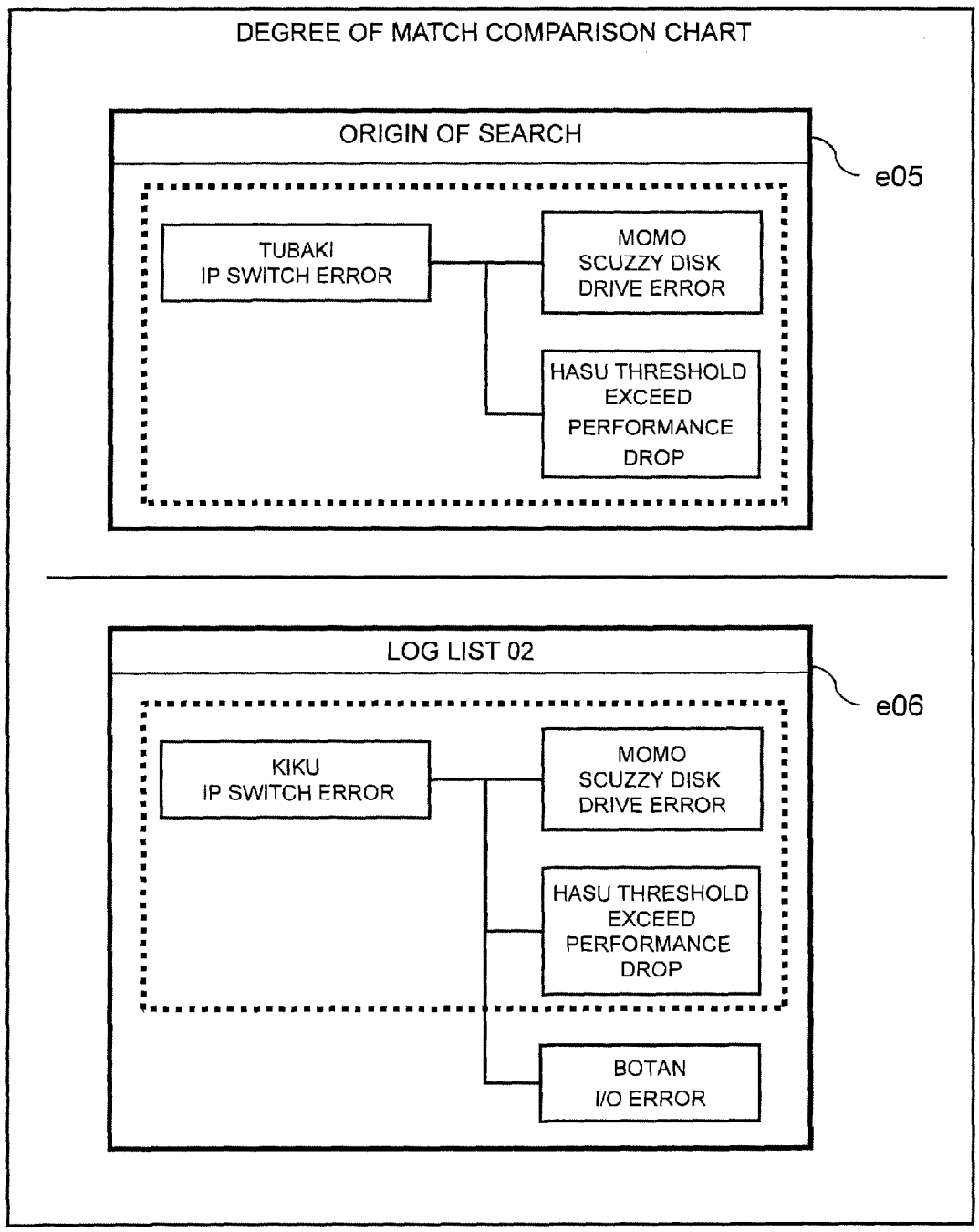
FIG. 24B shows a second example of a degree of match comparison screen.

FIG. 24A shows a first example of a degree of match comparison screen.

The information related to the failure that occurred this time is shown in detail in a display area e01. For example, the meta RCA rule ID 541 corresponding to the failure of this time, the node name 502, 512 or 522 of the event that has occurred, and the event details 565 are displayed in the display area e01.

The selected failure record is displayed in detail in an area e02. The meta RCA rule ID 541 of the failure record, the node name 502, 512 or 522 of the event that has occurred, and the event details 565 are displayed in the display area e02.

The match probability 2026 between the failure of this time and the failure record is displayed in a display area e03.

The recovery method 2025 of the failure record is displayed in an area e04.

FIG. 24A shows a second example of the degree of match comparison screen.

A diagram based on the event information, the topology information and the node information related to the failure of this time are displayed in a display area e05. The diagram displays how the nodes are interlinked, and what type of event occurred in which node. Specifically, for example, there are three blocks in the display area e05, the respective blocks correspond to any of the nodes, a link between blocks is in accordance with the topology identified from the topology information, and a character string displayed inside the block reveals the node name of the node corresponding to this block, and the details of the event (failure) that has occurred in this node.

A diagram based on the event information, the topology information and the node information related to the failure record is displayed in a display area e06. Specifically, for example, three blocks are displayed in the display area e06, and the respective blocks correspond to any node the same as in the display area e05.

The mutually matching portions of the information displayed in the display area e05 and the information displayed in the display area e06 (the portions having meta RCA rules that match) are shown using a method such as enclosing these portions within a dotted line. In accordance with this, the system administrator is able to visually discern the difference between the failure record that the system administrator selected and the failure of this time. Specifically, compared to the selected failure record, it is clear that the failure that occurred this time did not generate an I/O error in the node of the node name "BOTAN".

Other values may be displayed in the degree of match comparison screen in a case where the system administrator is able to refer to the comparison of the failure of this time and the failure record in the degree of match comparison screen. For example, information denoting the node type may be displayed in the respective blocks of FIG. 24B (the blocks corresponding to any node).

Figure 18B:
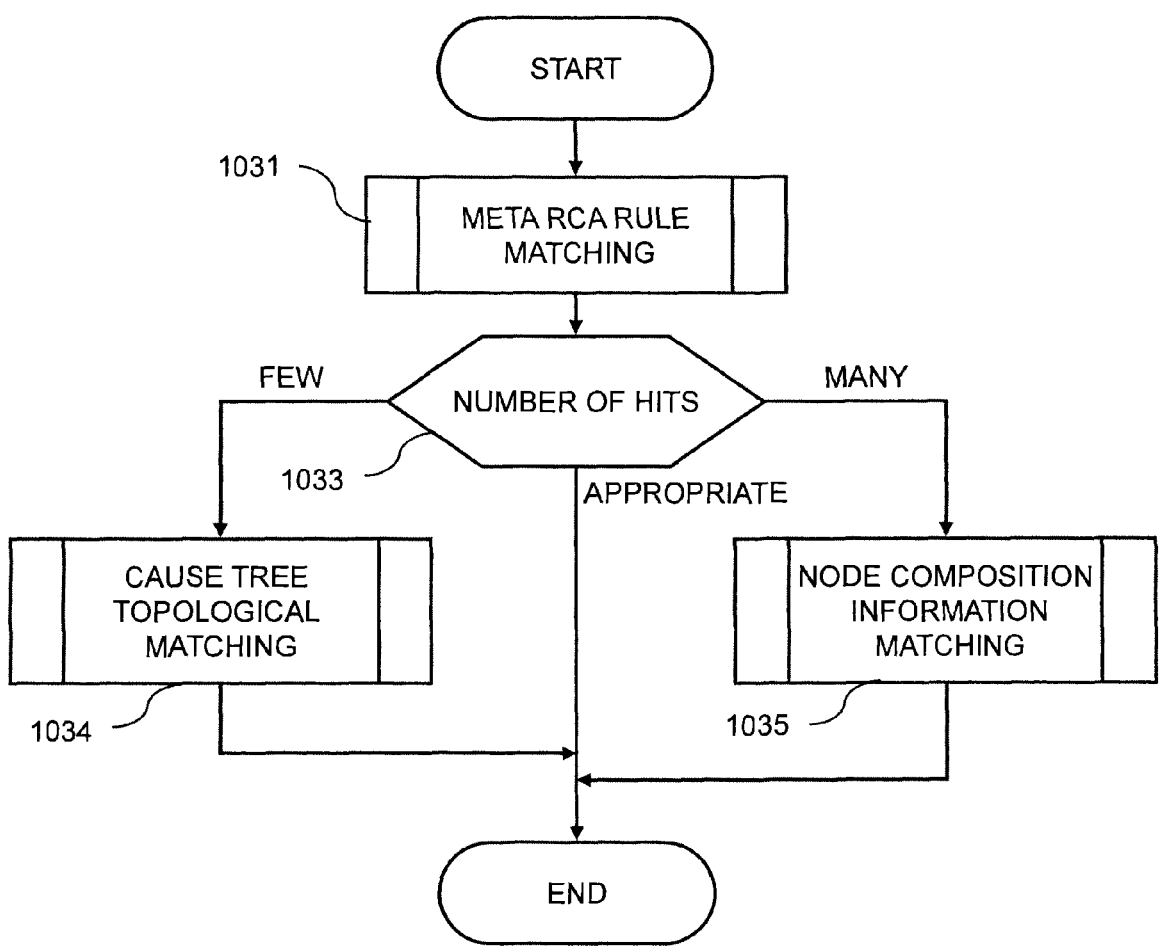
FIG. 18B is a flowchart showing the details of Step 1026 of FIG. 18A.

FIG. 18B shows the details of the Step 1026 of FIG. 18A.

(Step 1031) The context matching analysis program 124 carries out meta RCA rule matching as the processing of Step 1031. Step 1031 will be explained in detail below by referring to FIG. 18C.

Figure 18C:
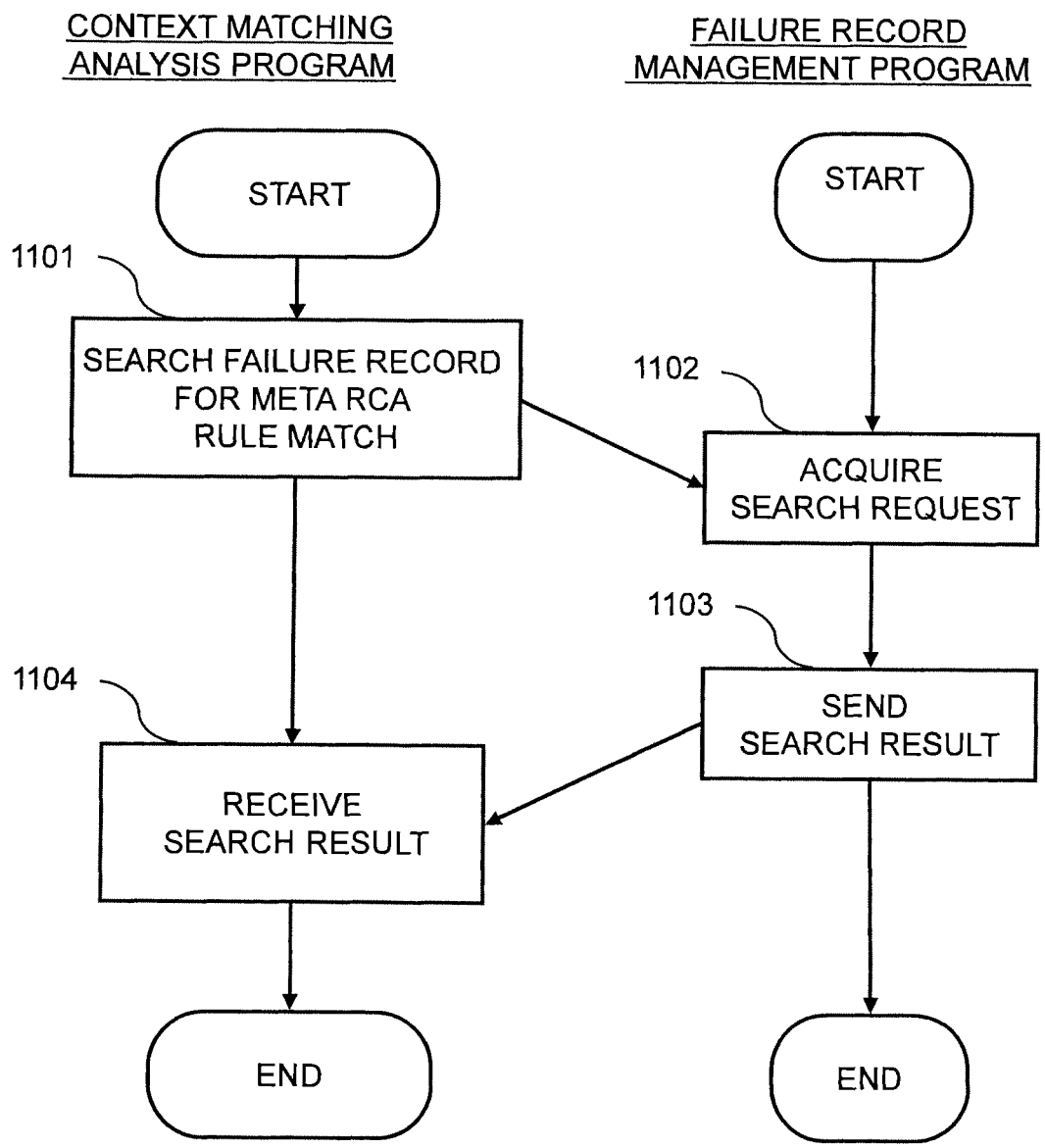
FIG. 18C is a flowchart showing the details of Step 1031 of FIG. 18B.

The flow of processing shown in FIG. 18C will be explained below.

(Step 1101) The context matching analysis program 124 sends a failure record entry search request including an identified failure analysis context to the failure record management program 125. The "identified failure analysis context" here is a failure analysis context having the same meta RCA rule ID as the meta RCA rule ID of the failure analysis context 119 obtained in Step 1024.

(Step 1102) The failure record management program 125 receives the search request sent in Step 1101.

(Step 1103) The failure record management program 125 responds to the search request received in Step 1102, and searches for a failure record entry having the above-mentioned identified failure analysis context. The program 125 sends information denoting this search result to the context matching analysis program 124. The information that is sent includes information registered in the failure record entry including the identified failure analysis context.

(Step 1104) The context matching analysis program 124 receives the information sent in Step 1103.

The explanation will return once again to the FIG. 18B.

(Step 1033) The context matching analysis program 124 executes Step 1034 in a case where the number of failure record entries obtained in Step 1031 is less than a first threshold (for example, 10). Conversely, the program 124 executes Step 1035 in a case where the number of failure record entries obtained in Step 1031 is greater than a second threshold (for example, 50). The second threshold is a value that is the same or larger than the first threshold. In a case where the number of failure record entries obtained in Step 1031 is appropriate (for example, greater than the first threshold but less than the second threshold), this flow of processing ends.

The system administrator is able to arbitrarily configure at least one of the above-mentioned first and second thresholds.

Figure 18D:
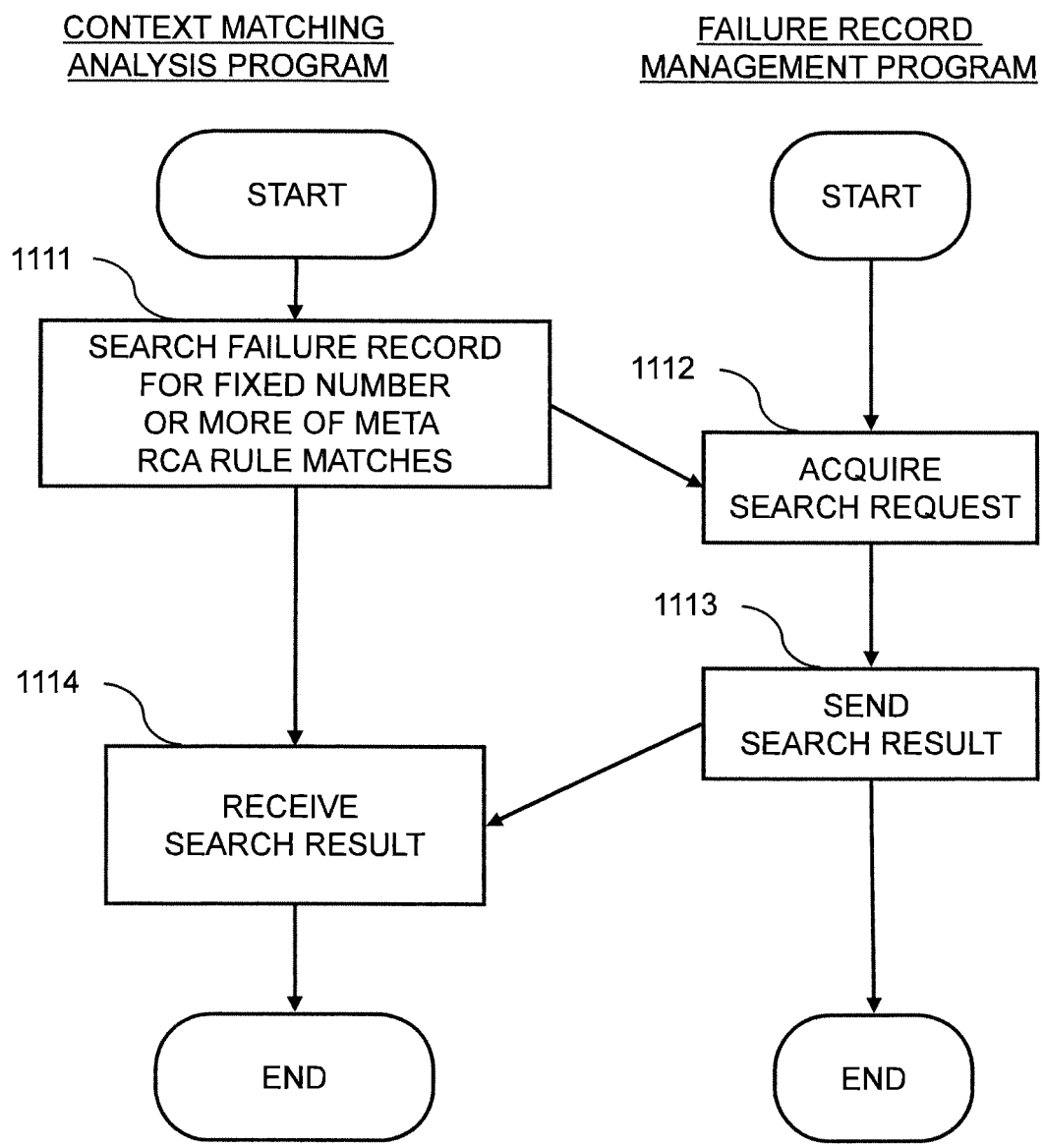
FIG. 18D is a flowchart showing the details of Step 1034 of FIG. 18B.

(Step 1034) The program 124 carries out a process for obtaining more failure record entries than in Step 1031 by easing the search conditions. Specifically, the processing shown in FIG. 18D is performed. In a case where the failure analysis context, which is the search query, has a plurality of meta RCA rules (that is, a case in which the expanded RCA rule is achieved using meta RCA rule multistep reasoning), processing is carried out so as to obtain all the failure record entries having one or more meta RCA rules that are the same as the search query.

The flow of processing shown in FIG. 18D will be explained below.

(Step 1111) The context matching analysis program 124 sends a search request for a failure record entry having k (where k is a natural number) or more meta RCA rule IDs 702 that are the same as the plurality of meta RCA rule IDs 602 in the search-origin failure analysis context (the failure analysis context that is the search key) 119 to the failure record management program 125. The system administrator is able to arbitrarily configure the value of k.

(Step 1112) The failure record management program 125 receives the search request sent in Step 1111.

(Step 1113) The program 125 responds to the search request received in Step 1112, and carries out a search. That is, the program 125 sends the information that is stored in the failure record entry having k or more meta RCA rule IDs 702 that are the same as the meta RCA rule ID 602 in the search-origin failure analysis context 119. For example, in a case where k=2, and, in addition, two meta RCA rule IDs match one another as illustrated in FIG. 18E, the information stored in the failure record entry shown in the drawing is sent. Furthermore, match probability may be allocated in descending order from the failure record entry with the largest number of meta RCA rule IDs matching the meta RCA rule ID 602 inside the search-origin failure analysis context 119, and information denoting these allocated match probabilities may be including in the information that is to be sent. That is, in this example, a match probability is calculated based on the number of meta RCA rule IDs that match the meta RCA rule ID 602 inside the search-origin failure analysis context 119. The match probability may also be determined using another calculation method.

(Step 1114) The context matching analysis program 124 receives the information sent in Step 1113. The number of pieces of information sent (the number of failure record entries that result in search hits) may be held down to less than the appropriate number (for example, a first number and/or a second number, which will be explained below).

The preceding has been an explanation of the search in Step 1034 of FIG. 18B. The search method is not limited to the method described above, and another method may be employed. For example, in a case where both the search-origin failure analysis context and all the failure record entries comprise one meta RCA rule ID, even though the meta RCA rule identified from the meta RCA rule ID inside the search-origin failure analysis context (called the first meta RCA rule below) and the meta RCA rule identified from the meta RCA rule ID inside the failure record entry (called the second meta RCA rule below) differ, the failure record management program 125 may target the failure record entry including the ID of the second meta RCA rule that has a match probability with respect to the first meta RCA rule of X % or greater (where X is a natural number) for a search hit. The match probability here will be based on the degree of overlap between the event group belonging to the first meta RCA rule and the event group belonging to the second meta RCA rule. Specifically, for example, the match probability is calculated based on at least one of a first ratio of the number of events that overlap with the total number of events belonging to the first meta RCA rule and a second ratio of the number of events that overlap with the total number of events belonging to the second meta RCA rule. According to the example of FIG. 24B, the first meta RCA rule displayed in the display area e05 partially matches with the second meta RCA rule displayed in the display area e06. The first ratio is 2/2 (=1) and the second ratio is 2/3. In a case where the match probability calculated on the basis of at least one of these ratios is the above-mentioned X % or greater, the second meta RCA rule displayed in the display area e06 becomes the search hit. It is possible to identify what event belongs to each meta RCA rule by referring to the meta RCA rule information 115.

The explanation will return to FIG. 18B once again.

Figure 18F:
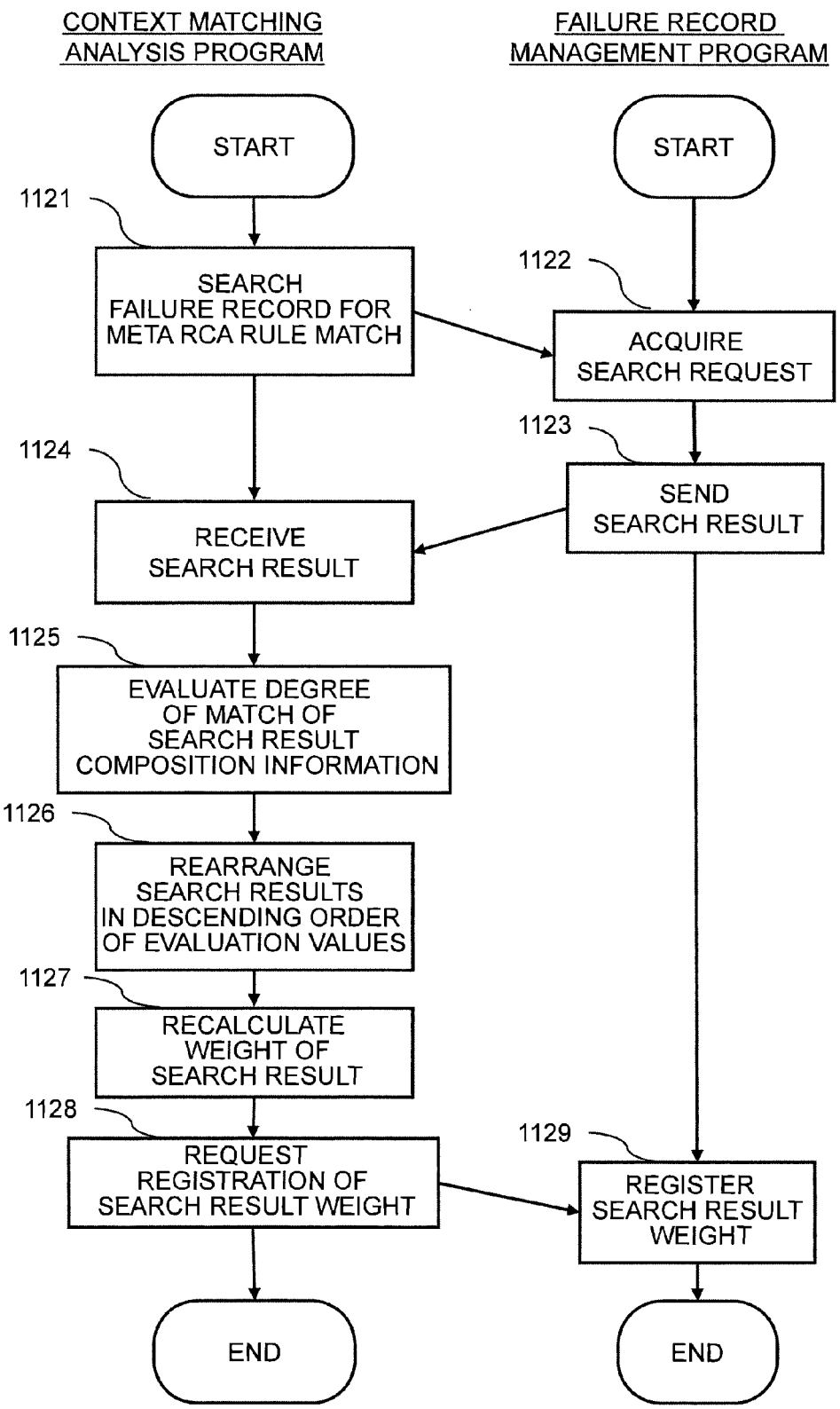
FIG. 18F is a flowchart showing the details of Step 1035 of FIG. 18B.

(Step 1035) The context matching analysis program 124 carries out the processing shown in FIG. 18F. This processing makes it possible to rapidly obtain, from the plurality of failure record entries that resulted in search hits, the failure record entry that approximates the condition of the search-origin failure analysis context by evaluating the match probability with respect to the search result obtained in Step 1031. The match evaluation, for example, is performed based on the degree to which (A) and (B) below match one another:

(A) either the hardware or software composition of the monitoring target node identified from the search-origin failure analysis context, and the elements of the configuration details; and (B) either the hardware or software composition of the monitoring target node identified from the failure record entry, and the elements of the configuration details.

The flow of processing shown in FIG. 18F will be explained below.

(Step 1121) The context matching analysis program 124 sends a search request including the meta RCA rule ID (the ID of the first meta RCA rule) in the failure analysis context 119 obtained in Step 1024 to the failure record management program 125.

(Step 1122) The program 125 receives the search request sent in Step 1101.

(Step 1123) The program 125 responds to the search request received in Step 1102, carries out the search, and sends the information stored in the failure record entry having the same meta RCA rule ID as the first meta RCA rule ID to the context matching analysis program 124.

(Step 1124) The context matching analysis program 124 receives the information sent in Step 1103.

(Step 1125) The program 124 carries out the processing of (A) through (D) below:

(A) selects values, which either match or approximate one another (for example, in a case where the difference between the continuous operation times is less than 3000, the values approximate one another), from at least one record from among the server record, the switch record, and the storage record identified from the ID inside the search-origin failure analysis context and at least one record from among the server record, the switch record, and the storage record identified from the ID inside the failure record entry obtained in Step 1124;

(B) selects the weight of each item corresponding to each value obtained in (A) above from the server weight information 800, the switch weight information 810 and the storage weight information 820 of the failure record information;

(C) calculates the cumulative value of the weights obtained in (B) above for each failure record entry obtained in Step 1124; and (D) allocates a match probability in accordance with the cumulative weight value to each failure record entry obtained in Step 1124 (for example, a high match probability is allocated to a failure record entry having a high cumulative weight value, and low match probability is allocated to a failure record entry having a low cumulative weight value).

Another element may be taken into account either instead of or in addition to the cumulative weight value in calculating the match probability.

(Step 1126) The program 124 rearranges the failure record entries in the descending order of the match probabilities obtained in Step 1125. By performing this process, the system administrator is able to refer to the failure that occurred this time in the order from the failure record having the highest match probability.

(Step 1127) In the comparison process of Step 1125, the program 124 relatively increases the weight corresponding to the item (called the "target item" in the explanations of FIG. 18F and FIG. 18G below) of the value selected in Step 1125 from among the information 800, 810 and 820 in the failure record information. The "relatively increases" may apply to increasing the weight corresponding to the target item, and may apply to decreasing the weight of a non-target item.

(Step 1128) The program 124 sends to the failure record management program 125 an update request including identification information (for example, the name) of the item whose weight has been changed, and the post-update weight (and/or the amount of change).

(Step 1129) The failure record management program 125 updates at least one of the information 800, 810 and 820 inside the failure record information in accordance with the above update request. That is, the program 125 reflects the weight calculated in Step 1127 in the corresponding records on the information 800, 810 and 820 inside the failure record information.

An overview of the flow of processing explained by referring to FIG. 18F will be explained by referring to FIG. 18G.

The search-origin failure analysis context (or the search query) includes a value denoting the weight of each attribute other than the type of the node apparatus for each node apparatus belonging to the expanded RCA rule (or topology) identified from this context.

According to the comparison of this context against a first failure record entry, the vendor and the OS match from the plurality of types of attributes. For this reason, the cumulative value for the first failure record entry works out to the total "130" of the weight of the vendor "50" and the weight of the OS "80".

By contrast, according to the comparison of this context against a second failure record entry, the IP address and the continuous operation time match from among the plurality of types of attributes. For this reason, the cumulative value for the second failure record entry works out to the total "30" of the weight of the IP address "20" and the weight of the continuous operation time "10".

The result of this is that the first failure record entry has a higher degree of similarity to the search-origin failure analysis context than the second failure record entry.

In a case where all of the vendor, the IP address, the OS and the continuous operation time are selected in Step 1125, the weights of these attributes are set to higher values in Step 1127. Furthermore, either instead of or in addition to the attribute corresponding to the value selected in Step 1125, the weight of the attribute corresponding to each value of the failure analysis record including information denoting the recovery method selected by the system administrator may be set to a higher value.

The system administrator identifies the recovery method for the failure that has occurred this time from the failure record information as described above. The system administrator, after completing the recovery of the failure that occurred this time, implements the flow of processing of FIG. 17 by regarding this event as the failure record. In accordance with this, the failure analysis context corresponding to the failure that occurred this time, the information denoting the root cause of the failure that occurred this time, and the information denoting the recovery method employed this time are made correspondent.

Step 1124 and beyond may be carried out based on the information obtained in Step 1031 of FIG. 18B.

The preceding has been an explanation of Example 1.

According to Example 1, the failure record entry, in addition to information denoting the root cause of a failure that has occurred and information denoting the recovery method corresponding to this root cause, also includes the failure analysis context, which correspond to this failure that has occurred. The failure analysis context is information, which includes information (called rule identification information below) for identifying, from among a plurality of cause/result rules, a cause/result rule that forms the basis of the root cause of the failure. The cause/result rule denotes the corresponding relationship between (x) and (y) below:

(x) as the root cause, the node apparatus type and the details of the event that occurred; and (y) as the result, the node apparatus type and the details of the event that occurred (what kind of event has occurred in which type of node apparatus).

A search query including the failure analysis context corresponding to the failure that has occurred is inputted to the management server by the system administrator. The management server responds to this search query, compares the failure analysis context (the first failure analysis context) of the search query against the failure analysis context inside each failure record entry of the failure record information (the second failure analysis context), and in accordance with this, identifies the failure record entry including the search-origin failure analysis context and the failure analysis context with a high degree of similarity. The management server displays the information registered in the identified second failure record entry (information including information denoting the recovery method). Consequently, the system administrator is quickly able to identify the method for recovering from the failure that has occurred.

It is also possible to register a new failure record entry including the first failure analysis context corresponding to the failure that has occurred and information denoting the identified recovery method. This registration task may be carried out manually by the system administrator, or may be performed automatically by the management server. In the case of the latter, for example, the management server is able to register a failure record entry including the first failure analysis context used at the time of the search, the information denoting the identified root cause, and the information denoting the identified recovery method.

At the time of the search for the failure record entry including the first failure analysis context and the similar second failure analysis context, information denoting what kind of event occurred in what type of node apparatus is identified based on the rule identification information inside the first and second failure analysis contexts. That is, the node apparatus types are compared to one another. For this reason, even when an event of the same kind has occurred in different node apparatuses, in a case where the type of the node apparatuses is the same, the relevant second failure analysis context will be similar to the first failure analysis context. Therefore, for example, in a case where a certain event occurred in server A the previous time and the same event has occurred in server B this time, there is the likelihood that the failure record entry including the second failure analysis context corresponding to this failure of the previous time will result in a search hit. That is, a similar event may generate a hit.

According to the explanation of Example 1, in principle, a failure record entry, which includes a cause/result rule identified from the first failure analysis context and the second failure analysis context that is related to a cause/result rule that is a complete match will result in a search hit. However, in a case where the number of failure record entries that result in a hit is less than a first number, the condition is eased and the search is carried out once again. Specifically, for example, in a case where the cause/result rules are more similar than a predetermined level of similarity (less than 100%), the search log record results in a hit. Conversely, in a case where the number of failure record entries that resulted in a hit is either greater than the first number or greater than a second number, which is larger than the first number, the condition is tightened and the search is carried out once again. Specifically, for example, in a case where attributes of a plurality of attributes besides the node apparatus type match up to a certain extent (a case in which the node apparatuses are somewhat similar), the search log record will result in a hit.

Example 2

<2-0: Overview of Example 2>

A management system related to an Example 2 of the present invention includes a supplemental function for making the steps of the recovery method meta in nature and registering same as a meta recovery method, a function for making the meta recovery method correspond to the meta RCA rule, and a function for collectively displaying the meta recovery method when referencing the root cause.

In the Example 1, the management system displays an identifier, such as the IP address of a node in which a failure occurred in the past, and the system administrator carries out a task by replacing the information of the displayed recovery method in the node in which a failure has occurred this time.

In the Example 2, by using a meta recovery method, the management system displays the recovery method using the identifier of the node in which a failure has occurred this time. In accordance with this, the system administrator is able to identify a candidate recovery method that is capable of being used when referring to the root cause.

<2-1: Compositional Difference Between Example 1 and Example 2>

Information denoting the meta recovery method (will be explained below) is made correspondent to the meta RCA rule information 115 (meta RCA record) of the Example 1.

In Step 1040 of the Example 1, a meta recovery method registration screen (FIG. 22A) is added to the failure record registration screen (FIG. 21), and a step for registering the meta recovery method is added.

In Step 1020 of the Example 1, information denoting the meta recovery method is added (FIG. 23) to the root cause candidate list and the certainty factor screen (FIG. 19).

<2-2: Definition of Terms>

The "meta recovery method" is a recovery method that is defined as a combination of finite elements (objects) provided by the management system. The meta recovery method does not rely on an identified node, and may be registered in correspondence with the meta RCA rule. In a case where it is possible to define the recovery method, the information format is not important. In this example, it is supposed that the meta recovery method is defined, for example, with respect to a combination of three elements, i.e., one or more Arcs, Branches and Commands. Incidentally, the "Arc" shows a transition to either a Branch or a Command. The "Branch" shows a condition branch. The "Command" shows a process.

<2-3: Meta Recovery Method Registration>

The registration of the meta recovery method, for example, is carried out at a timing immediately prior to sending the failure record registration information in Step 1040 in the Example 1.

Figure 22A:
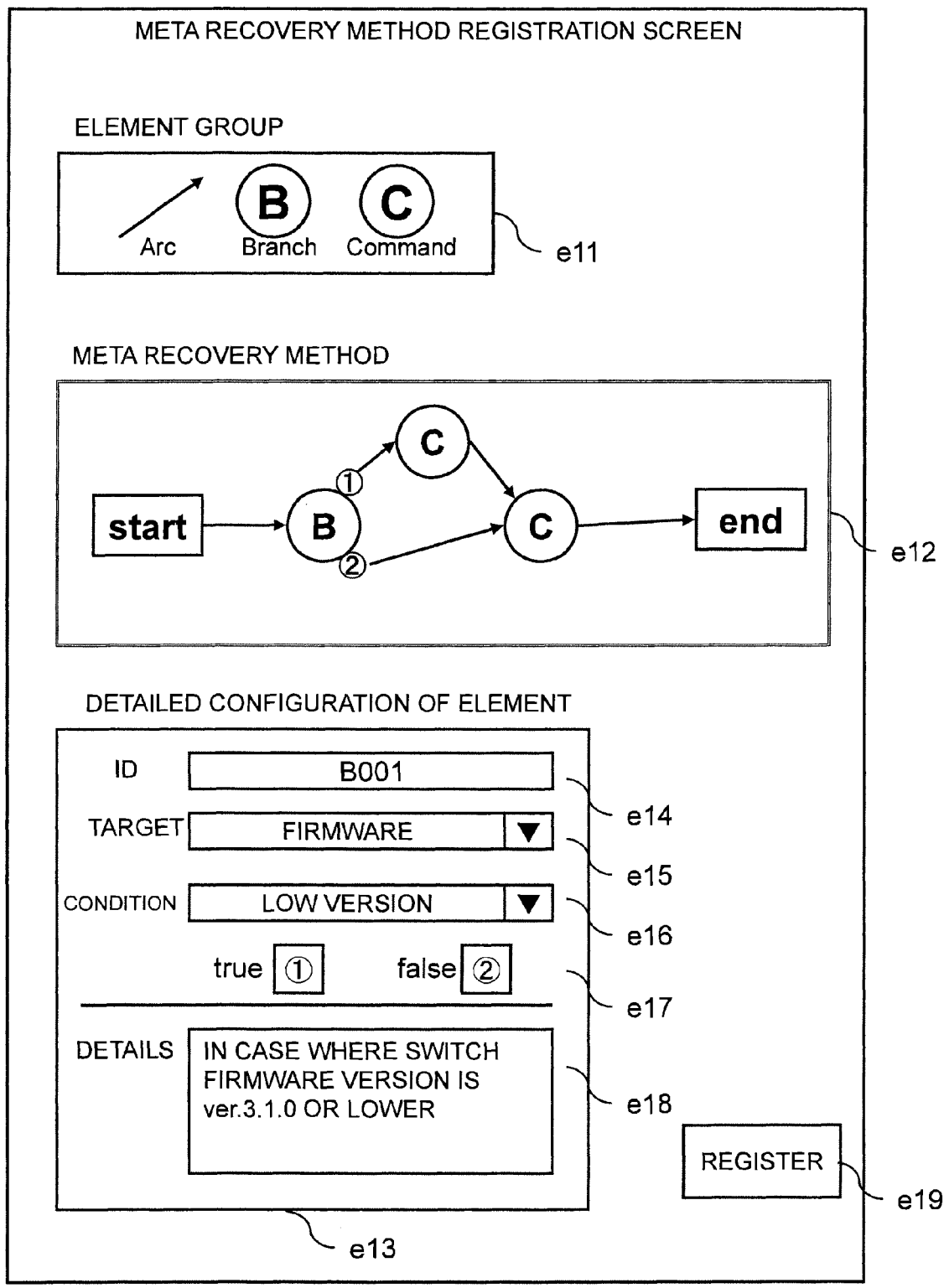
FIG. 22A shows an example of a meta recovery method registration screen displayed in an Example 2.

FIG. 22A shows an example of a meta recovery method registration screen.

The icons of the Arc, the Branch and the Command are set in a display area e11. The system administrator is able to set the icons in a display area e11 by dragging and dropping any icon in the display area e12.

FIG. 22A e02 is the edit screen for defining the meta recovery method. The composition of the meta recovery method may be defined by arranging the icons of the display area e01.

A display area e13 is a window for implementing the detailed configuration of each icon set in the display area e12. This drawing shows an example of the Branch configuration screen.

A display area e14 shows the identifier of the relevant icon.

A display area e15 is a form for selecting the target of the condition in the condition branch. The selected item is a finite element provided by the system side.

A display area e16 is a form for selecting the details of the condition in the condition branch. The selected item is a finite element provided by the system side.

A display area e17 defines the transition destination in a case where the condition defined in the display area e16 is true and defines the transition destination in a case where the condition defined in the display area e16 is false.

A display area e18 is a form for inputting branch content details that are unable to be expressed in the display area e16 alone. This information is registered in natural language by the system administrator.

The system administrator completes the registration by pressing the Register button of a display area e19 when the definition of the meta recovery method has been completed for the relevant screen, and makes this meta recovery method correspondent to the meta RCA rule information registered in Step 1140 of the Example 1.

The display area e13 shown in FIG. 23B shows an example of a case in which the display area e13 is a Command configuration screen.

The display area e14 shown in FIG. 23B shows the relevant icon identifier.

The display area e15 in FIG. 23B is a form for selecting the process target. The selected item is a finite element provided by the system side.

The display area e16 in FIG. 23B is a form for selecting the process content. The selected item is a finite element provided by the system side.

The display area e17 shown in FIG. 23B is a form for inputting process content details that are unable to be expressed in the display area e16 alone. This information is registered in natural language by the system administrator.

In other words, in the definition of the meta recovery method, the object transition flow from the start of recovery to the end is defined. Specifically, the transition from which object (the condition branch or the process) to which object is defined.

<2-4: Acquisition of Meta Recovery Method>

The acquisition of the meta recovery method, for example, is implemented immediately after selecting the meta RCA rule in Step 1015 of the Example 1. Since the meta RCA rule is correspondingly registered at the time of the meta recovery method registration, the meta recovery method is also determined when the meta RCA rule is determined.

In Step 1019 of the Example 1, the meta recovery method is sent together.

In Step 1020 of the Example 1, the meta recovery method is also displayed in addition to the root cause certainty factor.

FIG. 23 is an example of the candidate/certainty factor screen displayed in the Example 2.

Compared to FIG. 19 of the Example 1, a display area e21, which is a table for representing the cumulative total of the details of Command processing inside all the meta recovery methods obtained, and a column e22, which lists up summaries of the Command processing of the meta recovery method, have been added.

In accordance with the display area e21, "server rebooted 7 times, server replaced 2 times, recovery from backup 2 times" are displayed. In accordance with this, the system administrator may easily identify process variations in the recoveries that are capable of being used.

In the column e22, overviews of the recovery processes corresponding to the respective root causes are described. In accordance with this, the system administrator is able to quickly identify the overview of the recovery method corresponding to each root cause.

According to the Example 2 of the present invention described above, a meta recovery method, which is defined by a continuous flow that makes use of common parts like a condition branch (Branch) and a process (Command), is prepared. Then, the meta recovery method is related to the meta RCA rule, which combines an event group with a root cause.

In accordance with this, it is possible to define everything from the detection of the failure that occurred to the recovery method as a single rule.

Example 3

<3-0: Overview of Example 3>

A specific example of a data structure in a case where an existing ordinary rule-based system is used will be shown. The description that follows is a single specific example of a case in which the various types of information described in the Example 1 were regarded as abstractions, but in the case of a rule-based system, it is also possible to describe something other than the relationship between two or more either physical or logical targets, such as a temporal condition.

This example is one example of the present invention in which the general-purpose rule-based system of the Non-Patent Literature 1 mentioned above has been applied.

The Non-Patent Literature 1 discloses a general-purpose rule-based system having a rule memory and a fact memory in a ruled-based system. The rule memory stores general-purpose rules described without depending on identified entities. The fact memory stores specific information of identified entities.

This rule-based system uses these rules and information to derive new facts.

<3-1: Specific Data Structure of Example 3>

Based on the Non-Patent Literature 1, a Causality Rule and a Topology Rule are defined as rules.

The Causality Rule describes the relationship between an event and its cause without depending on an identified topology. A specific example of the Causality Rule is as shown below.

C-RULE-100:
IF Server (X) & Storage (Y) & FC-Connected (x, y) & EventtHappensOn (IO_ERROR, x, y, t1) & EventHappensOn (CTRL_FAIL, y, t2) & WithinTimeWindow (t1, t2, "10 minutes")
THEN IdentifyRootCause (CTRL_FAIL, y).

The Topology Rule describes the node coupling status without depending on an identified topology. A specific example of the Topology Rule is as shown below.

T-RULE-200:
IF FC-connected (x, y) & FC-connected (z, y)
THEN FC-connected (x, z).

The lower case letters of the alphabet such as x, y show variables. It is supposed that IO_ERROR and "ServerA" are literals representing constants (identified instances).

The topology application program 121 stores the Causality Rule and the Topology Rule in the rule memory of the rule-based system.

The topology application program 121 detects the below-mentioned topology fact by applying the Topology Rule to the monitoring target node 30, and stores this topology fact in the fact memory of the rule-based system.

TF1: Serer ("ServerA")
TF2: Storage ("StorageA")
TF3: Switch ("SwitchA")
TF4: FC-Connected ("ServerA", "ABC")
TF5: FC-Connected ("AMS1000", "ABC")

The rule-based system creates an instance like that in the following example by combining the Causality Rule and the topology fact.

C-RULE-100-INSTANCE-1:
IF EventHappensOn (IO_ERROR, "SERVERA", t1) &
EventHappensOn (CTRL_FAIL, "StorageA", t2) &
WithinTimeWindow (t1, t2, "10 minutes")
THEN IdentifyRootCause (CTRL_FAIL, "StorageA").

The C-RULE-100-INSTANCE-1 is also stored on the memory.

In a case where the topology application program 121 is monitoring the monitoring target node 30, and observes that an IO_ERROR event has occurred on the "ServerA" and a CTRL_FAIL event has occurred on the "StorageA" within the time window of an event correlation process, the topology application program 121 stores the next event fact with respect to the rule-based system in the memory.

EF1: EventHappensOn (IO_ERROR, "ServerA", "12:32:12 22009/03/10")
EF2: EventHappensOn (CTRL_FAIL, "AMS1000", "12:32:10 22009/03/10")
EF3: WithinTimeWindow ("12:32:10 22009/03/10", "12:32:12 22009/03/10", "10 minutes")

The rule-based system is able to derive the IdentifyRootCause (CTRL_FAIL, "StorageA") from the C-RULE-100-INSTANCE-1 and the event fact, and to identify the root cause in accordance with this.

In the above-mentioned framework,
the intermediate format of C-RULE-100-INSTANCE-1 is the expanded RCA rule, and
the C-RULE-100 (Causality Rule) corresponds to the meta RCA rule, making "C-RULE-100" the meta RCA rule ID 541.

There are also cases where multistep reasoning is performed using a plurality of Causality Rules, and there may be a plurality of meta RCA rules.

In this Example, it is possible to obtain the effect of the present invention by referencing the inside of the memory, acquiring the Causality Rule corresponding to a meta RCA rule used in the derivation of the root cause and the instance corresponding to the expanded RCA rule, and regarding same as the failure analysis context.

As described above, an ordinary rule-based system is applicable. Furthermore, a storage scheme like that below may be used as the data structure of the expanded RCA rule information.

(A) store all combination patterns for an event, which occurs in a monitoring target node, and which differentiates between the site of occurrence (to include the node apparatus) that is targeted for management by the management system and the event details; and
(B) correspondingly store from among the combinations of (A) the site of occurrence (to include the node apparatus), which is the root cause and the event details for a combination that enables the identification of the root cause.

Furthermore, the storage of the (A) combination, which is not the corresponding root cause, may be omitted.

According to the above explanation, there has been explained a management system, which includes an interface for communicating with a plurality of node apparatuses, which is one aspect of the present invention, a processor for detecting via the above-mentioned interface an event that occurs in the above-mentioned plurality of node apparatuses, a storage resource for storing event information, meta rule information, and failure record information, a display device for displaying the information with respect to the above-mentioned plurality of node apparatus, and an input device, characterized in that:

the above-mentioned event information includes an event entry representing information for identifying the generation-source node apparatus of the above-mentioned event that occurred, and the type of the above-mentioned event that occurred;
the above-mentioned meta rule information includes a potential event type that could potentially occur in the node apparatus, and a meta rule representing an event type that can be identified as a root cause in a case where an event corresponding to the above-mentioned potential event type has occurred; and
the above-mentioned failure record information includes a failure record entry, which includes information representing a recovery method and information for identifying the above-mentioned meta rule to which the above-mentioned recovery method corresponds.

The above-mentioned processor:
(A) identifies a first cause event, which is the root cause of a first event identified by the above-mentioned event entry stored in the above-mentioned event information based on the above-mentioned meta rule information, and identifies a first meta rule used in identifying the above-mentioned first cause event;
(B) receives via the above-mentioned input device a first recovery method, which is a method for recovering from that above-mentioned first cause event, and adds a first failure record entry corresponding to the above-mentioned first meta rule to the above-mentioned failure record information based on the above-mentioned first recovery method;
(C) identifies a second cause event, which is the root cause of a second event identified by the above-mentioned event entry stored in the above-mentioned event information based on the above-mentioned meta rule information, and identifies a second meta rule used in identifying the second cause event; and
(D) identifies a predetermined failure record entry corresponding to the above-mentioned second meta rule based on the above-mentioned failure record information.

The above-mentioned display device:
(X) displays information related to the above-mentioned second cause event as the root cause of the above-mentioned second event; and
(Y) displays the method for recovering from the above-mentioned second cause event based on the above-mentioned predetermined failure record entry.

Furthermore, the above-mentioned failure record entry of the management system includes the identifier of the node apparatus to which the recovery method is applied, and the above-mentioned display device:
(Z) may display the identifier of the node apparatus shown in the above-mentioned predetermined failure record entry as the identifier of the node apparatus to which the recovery method shown in the above-mentioned predetermined failure record entry of the (Y) is applied.

In a case where the generation-source node apparatus of the above-mentioned first cause event and the generation-source node apparatus of the above-mentioned second cause event are different, the above-mentioned display device of the management system:
(a) may display the information including an identifier of the generation-source node apparatus of the above-mentioned second cause event as the display of information related to the above-mentioned second cause event of the above-mentioned (X); and
(b) may display an identifier of the generation-source node apparatus of the above-mentioned first cause event as the display of the identifier of the node apparatus shown by the above-mentioned predetermined failure record entry of the above-mentioned (Z).

Also, the identification of the above-mentioned (D):
(D1) may select the above-mentioned failure record entry representing a meta rule that is identical to the above-mentioned second meta rule;

(D2) may identify the above-mentioned predetermined failure record entry based on the match probability between the meta rule to which the above-mentioned failure record entry corresponds and the above-mentioned second meta rule in a case where the number of failure record entries selected in the above-mentioned (D1) is less than a first threshold; and (D3) may identify the failure record entry selected in the above-mentioned (D1) as the above-mentioned predetermined failure record entry.

The above-mentioned storage resource stores the composition configuration information of the above-mentioned plurality of node apparatuses, the above-mentioned failure record entry includes past composition configuration information corresponding to the points in time at which the entries of the above-mentioned plurality of node apparatuses are created, and the identification of the above-mentioned (D):

(D4) may identify the above-mentioned predetermined failure record entry based on the match probability between the above-mentioned past composition configuration information included in the above-mentioned failure record entry and the above-mentioned composition configuration information in a case where the number of failure record entries selected in the above-mentioned (D1) is greater than a second threshold.

Furthermore, the above-mentioned (D4) does not have to be premised on (D2) and (D3). The above-mentioned storage resource may store weight information representing a weight value of an item of the composition configuration information, and the identification to the above-mentioned (D4) may be carried out based on the above-mentioned weight information.

The first recovery method of the above-mentioned (B) may be the meta recovery method, which is the recovery method that does not include the identifier of the generation-source node apparatus of the above-mentioned first cause event, and the display of the method for recovering from the above-mentioned second cause event of the above-mentioned (Y) may be a display of the above-mentioned meta recovery method and the identifier of the generation-source node apparatus of the above-mentioned second cause event.

The storage resource may be inside or outside of the management system. In a case where the storage resource is inside the management system, the storage resource, for example, is a memory. In a case where the storage resource is outside the management system, the storage resource, for example, is a storage apparatus (for example, a disk array device).

The preceding has been explanations of a number of Examples of the present invention, but these are merely examples for explaining the present invention, and do not purport to limit the scope of the present invention to these Examples. The present invention may also be put into practice in a variety of other modes.

REFERENCE SIGNS LIST

10 Management server

We claim:

1. A computer system comprising:
   at least one node apparatus; and
   a management system comprising one or more computers, and configured to detect an event that occurs in the node apparatus,
   wherein the management system is configured to store event information and meta rule information,
   wherein the event information includes an event entry representing an event identifier of an event that has occurred in a certain node apparatus, and a node identifier of the certain node apparatus in which the event occurred,
   wherein the meta rule information includes a meta rule representing, without including an identifier of the node apparatus, a potential event type that could potentially occur in the node apparatus and a root cause event type that can be identified as a root cause in a case where an event corresponding to the potential event type occurs,
   wherein the meta rule includes an expanded rule, which is an expanded Root Cause Analysis (RCA) rule,
   wherein the management system is configured:
   (A) to identify a first cause event, which is the root cause of a first event identified by the event entry based on the meta rule information, and to identify a first meta rule used in the identification of the first cause event;
   (B) to receive via an input device, after the identification of the first cause event, a meta recovery method, which is a method for recovering from the first cause event, and to register the meta recovery method to correspond to the first meta rule identified in (A);
   (C') to create the expanded rule based on the meta rule information and topology information of the at least one node apparatus;
   (C) to identify a second cause event, which is the root cause of a second event identified by the event entry based on the meta rule information, and to identify a second meta rule used in the identification of the second cause event;
   (D) to identify a particular meta recovery method registered in the management system, which corresponds to the second meta rule identified in (C);
   (E) to display the particular meta recovery method with information about the second cause event; and
   (F) display, before the reception of the meta recovery method in (B), a meta recovery method registration screen including:
   an element group area showing various types of element icons for describing the meta recovery method,
   a meta recovery method edit area showing element icons which area drag and dropped from the element group area for representing an on editing meta recovery method, and
   an element detail configuration area showing detail of the element, and
   wherein the element detail configuration area for a first type element and the element detail configuration area for a second type element different from the first type element are different.

2. A computer system according to claim 1,
   wherein the various types of element icons include:
   a branch icon representing a branch function;
   a command icon representing a content of the recovery method; and
   an arc icon for connecting between the branch icons and/or the command icons, and
   wherein the meta recovery method edit area includes a start icon and an end icon, and the arc icon can connect between the start icon or the end icon in addition to the branch icons and/or the command icons.

3. A computer system according to claim 1,
   wherein the management system is configured:
   (G) to receive, via the input device, a non-meta recovery method and to register the non-meta recovery method to correspond to the first meta rule identified in (A);
   (H) after the identification of the second cause event in (C), to identify a particular non-meta recovery method registered in the management system, which corresponds to the second meta rule identified in (C); and
(I) to display the particular non-meta recovery method with information about the second cause event.

4. A management system for detecting an event that occurs in a node apparatus, comprising:
a memory storing event information and meta rule information,
wherein the event information includes an event entry representing an event identifier of an event that has occurred in a certain node apparatus, and a node identifier of the certain node apparatus in which the event occurred,
wherein the meta rule information includes a meta rule representing, without including an identifier of the node apparatus, a potential event type that could potentially occur in the node apparatus and a root cause event type that can be identified as a root cause in a case where an event corresponding to the potential event type occurs,
wherein the meta rule includes an expanded rule, which is an expanded Root Cause Analysis (RCA) rule, and
a processor configured:
(A) to identify a first cause event, which is the root cause of a first event identified by the event entry based on the meta rule information, and to identify a first meta rule used in the identification of the first cause event;
(B) to receive via an input device, after the identification of the first cause event, a meta recovery method, which is a method for recovering from the first cause event, and to register the meta recovery method to correspond to the first meta rule identified in (A);
(C') to create the expanded rule based on the meta rule information and topology information of the at least one node apparatus;
(C) to identify a second cause event, which is the root cause of a second event identified by the event entry based on the meta rule information, and to identify a second meta rule used in the identification of the second cause event;
(D) to identify a particular meta recovery method registered in the management system, which corresponds to the second meta rule identified in (C);
(E) to display the particular meta recovery method with information about the second cause event; and
(F) display, before the reception of the meta recovery method in (B), a meta recovery method registration screen including:
an element group area showing various types of element icons for describing the meta recovery method,
a meta recovery method edit area showing element icons which area drag and dropped from the element group area for representing an on editing meta recovery method, and
an element detail configuration area showing detail of the element, and
wherein the element detail configuration area for a first type element and the element detail configuration area for a second type element different from the first type element are different.

5. A management system according to claim 4,
wherein the various types of element icons include:
a branch icon representing a branch function;
a command icon representing a content of the recovery method; and
an arc icon for connecting between the branch icons and/or the command icons, and
wherein the meta recovery method edit area includes a start icon and an end icon, and the arc icon can connect between the start icon or the end icon in addition to the branch icons and/or the command icons.

6. A management system according to claim 4, further configured:
(G) to receive, via the input device, a non-meta recovery method and to register the non-meta recovery method to correspond to the first meta rule identified in (A);
(H) after the identification of the second cause event in (C), to identify a particular non-meta recovery method registered in the management system, which corresponds to the second meta rule identified in (C); and
(I) to display the particular non-meta recovery method with information about the second cause event.

7. A non-transitory computer-readable storage medium storing a program for detecting an event that occurs in a node apparatus, the program, when executed by a management system, performs a method, the management system comprising a memory storing event information and meta rule information,
wherein the event information includes an event entry representing an event identifier of an event occurred in a certain node apparatus, and a node identifier of the certain node apparatus in which the event occurred,
wherein the meta rule information includes a meta rule representing, without including an identifier of the node apparatus, a potential event type that could potentially occur in the node apparatus and a root cause event type that can be identified as a root cause in a case where an event corresponding to the potential event type occurs,
wherein the meta rule includes an expanded rule, which is an expanded Root Cause Analysis (RCA) rule, the method comprising:
(A) identifying a first cause event, which is the root cause of a first event identified by the event entry based on the meta rule information, and identifying a first meta rule used in the identification of the first cause event;
(B) receiving via an input device, after the identification of the first cause event, a meta recovery method, which is a method for recovering from the first cause event, and registering the meta recovery method to correspond to the first meta rule identified in (A);
(C') creating the expanded rule based on the meta rule information and topology information of the at least one node apparatus;
(C) identifying a second cause event, which is the root cause of a second event identified by the event entry based on the meta rule information, and identifying a second meta rule used in the identification of the second cause event;
(D) identifying a particular meta recovery method registered in the management system, which corresponds to the second meta rule identified in (C);
(E) displaying the particular meta recovery method with information about the second cause event; and
(F) displaying, before the reception of the meta recovery method in (B), a meta recovery method registration screen including:
an element group area showing various types of element icons for describing the meta recovery method,
a meta recovery method edit area showing element icons which area drag and dropped from the element group area for representing an on editing meta recovery method, and
an element detail configuration area showing detail of the element, and wherein the element detail configuration area for a first type element and the element detail configuration area for a second type element different from the first type element are different.

8. A non-transitory computer-readable storage medium according to claim 7,
wherein the various types of element icons include:
a branch icon representing a branch function;
a command icon representing a content of the recovery method; and
an arc icon for connecting between the branch icons and/or the command icons, and
wherein the meta recovery method edit area includes a start icon and an end icon, and the arc icon can connect between the start icon or the end icon in addition to the branch icons and/or the command icons.

9. A non-transitory computer-readable storage medium according to claim 7, wherein the method further comprises:
(G) receiving, via the input device, a non-meta recovery method and registering the non-meta recovery method to correspond to the first meta rule identified in (A);
(H) after the identification of the second cause event in (C), identifying a particular non-meta recovery method registered in the management system, which corresponds to the second metarule identified in (C); and
(I) displaying the particular non-meta recovery method with information about the second cause event.

* * * * *